US012674994B2

(12) United States Patent
Ozcan et al.

(10) Patent No.: US 12,674,994 B2
(45) Date of Patent: *Jul. 7, 2026

(54) DIFFRACTIVE OPTICAL NETWORK FOR SEEING THROUGH DIFFUSIVE OR SCATTERING MEDIA

(71) Applicant: THE REGENTS OF THE UNIVERSITY OF CALIFORNIA, Oakland, CA (US)

(72) Inventors: Aydogan Ozcan, Los Angeles, CA (US); Yi Luo, Los Angeles, CA (US); Ege Cetintas, Los Angeles, CA (US); Yair Rivenson, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 18/571,653

(22) PCT Filed: Jun. 29, 2022

(86) PCT No.: PCT/US2022/035615
§ 371 (c)(1),
(2) Date: Dec. 18, 2023

(87) PCT Pub. No.: WO2023/287586
PCT Pub. Date: Jan. 19, 2023

(65) Prior Publication Data
US 2024/0288701 A1 Aug. 29, 2024

Related U.S. Application Data

(60) Provisional application No. 63/220,911, filed on Jul. 12, 2021.

(51) Int. Cl.
| | | |
|---|---|---|
| G02B 27/09 | (2006.01) | |
| G02B 5/18 | (2006.01) | |
| G02B 6/42 | (2006.01) | |

(52) U.S. Cl.
CPC ....... G02B 27/0944 (2013.01); G02B 5/1866 (2013.01); G02B 6/4206 (2013.01)

(58) Field of Classification Search
CPC .......................... G02B 27/0944; G02B 5/1866; G02B 6/4206; G02B 27/4238; G06N 3/082; G06N 3/084; G06N 3/067
See application file for complete search history.

(56) References Cited

U.S. PATENT DOCUMENTS

| | | |
|---|---|---|
| 8,842,901 B2 | 9/2014 | Ozcan et al. |
| 11,392,830 B2 | 7/2022 | Ozcan et al. |
| | (Continued) | |

FOREIGN PATENT DOCUMENTS

| | | |
|---|---|---|
| WO | WO 2019/200289 | 10/2019 |
| WO | WO 2019/200289 A1 | 10/2019 |
| | (Continued) | |

OTHER PUBLICATIONS

The extended European search report dated Oct. 11, 2024 for European Patent Application No. 22842649, (13 pages).

(Continued)

*Primary Examiner* — Vijay Shankar
(74) *Attorney, Agent, or Firm* — VISTA IP LAW GROUP LLP

(57) ABSTRACT

A computer-free system and method is disclosed that uses an all-optical image reconstruction method to see through random diffusers at the speed of light. Using deep learning, a set of transmissive layers are trained to all-optically reconstruct images of arbitrary objects that are distorted by random phase diffusers. After the training stage, the resulting dif- (Continued)

fractive layers are fabricated and form a diffractive optical network that is physically positioned between the unknown object and the image plane to all-optically reconstruct the object pattern through an unknown, new phase diffuser. Unlike digital methods, all-optical diffractive reconstructions do not require power except for the illumination light. This diffractive solution to see through diffusive and/or scattering media can be extended to other wavelengths, and can fuel various applications in biomedical imaging, astronomy, atmospheric sciences, oceanography, security, robotics, autonomous vehicles, among many others.

30 Claims, 20 Drawing Sheets

(56) References Cited

U.S. PATENT DOCUMENTS

| | | | |
|---|---|---|---|
| 11,501,544 B2 | 11/2022 | Ozcan et al. | |
| 11,694,082 B2 | 7/2023 | Ozcan et al. | |
| 11,803,238 B1 * | 10/2023 | Tesdahl | G06F 3/013 |
| 11,982,848 B2 * | 5/2024 | Elsinger | G02B 6/4208 |
| 12,242,667 B2 * | 3/2025 | Tesdahl | G02B 27/017 |
| 12,429,701 B2 * | 9/2025 | Muravev | G06T 19/006 |
| 2012/0148141 A1 | 6/2012 | Ozcan et al. | |
| 2019/0206095 A1 | 7/2019 | Xing et al. | |
| 2021/0097378 A1 | 4/2021 | Rodrigues et al. | |
| 2021/0209337 A1 | 7/2021 | Ozcan et al. | |
| 2022/0253685 A1 | 8/2022 | Ozcan et al. | |
| 2022/0327371 A1 | 10/2022 | Ozcan et al. | |
| 2023/0024787 A1 | 1/2023 | Ozcan et al. | |
| 2023/0153600 A1 | 5/2023 | Ozcan et al. | |
| 2023/0162016 A1 | 5/2023 | Ozcan et al. | |
| 2023/0251189 A1 | 8/2023 | Ozcan et al. | |
| 2024/0242067 A1 * | 7/2024 | Liu | G06N 3/0675 |
| 2025/0164708 A1 * | 5/2025 | Yoo | G02B 27/01 |

FOREIGN PATENT DOCUMENTS

| | | |
|---|---|---|
| WO | WO 2019/236569 | 12/2019 |
| WO | WO 2020/247828 | 12/2020 |
| WO | WO 2021/050550 | 3/2021 |
| WO | WO 2021/050550 A1 | 3/2021 |
| WO | WO 2021/231139 | 11/2021 |
| WO | WO 2021/237170 | 11/2021 |
| WO | WO2022006018 | 1/2022 |
| WO | WO 2022/056422 | 3/2022 |
| WO | WO 2022/087345 | 4/2022 |
| WO | WO 2023/287586 | 1/2023 |
| WO | WO 2023/141403 | 7/2023 |
| WO | WO 2023/183859 | 9/2023 |
| WO | WO 2023/230412 | 11/2023 |

OTHER PUBLICATIONS

Aydogan Ozcan et al., EAGER: All-Optical Information Processing Device for Seeing Through Diffusers at the Speed of Light, NSF Awards, May 21, 2021, pp. 1-4, XP093209821, https://www.nsf.gov/awardsearch/showAward?AWD_ID=2054102.

Yi Luo et al., Computational imaging without a computer: seeing through random diffusers at the speed of light, eLight (2022) 2:4, XP093209823, https://doi.org/10.1186/s43593-022-00012-4.

Communication pursuant to Rules 70(2) and 70a(2) EPC dated Oct. 29, 2024 for European Patent Application No. 22842649, (1page).

PCT International Search Report for PCT/US2022/035615, Applicant: The Regents of the University of California, Form PCT/ISA/210 and 220, dated Oct. 13, 2022 (3 pages).

PCT Written Opinion of the International Search Authority for PCT/US2022/035615, Applicant: The Regents of the University of California, Form PCT/ISA/237, dated Oct. 13, 2022 (8 pages).

Bijie Bai et al., Pathological crystal imaging with single-shot computational polarized light microscopy, J Biophotonics, (Jan. 2020), 13(1): e201960036. doi:10.1002/jbio.201960036.

Jacopo Bertolotti et al., Non-invasive imaging through opaque scattering layers, Nature, vol. 491, Nov. 8, 2012, pp. 232-234; doi:10.1038/nature11578.

Julie Chang et al., Hybrid optical-electronic convolutional neural networks with optimized diffractive optics for image classification, Scientific Reports, (2018), 8:12324, DOI:10.1038/s41598-018-30619-y.

Eitan Edrei et al., Optical imaging through dynamic turbid media using the Fourier-domain shower-curtain effect, Optica (Jan. 2, 20160), 3(1): 71-74. doi:10.1364/OPTICA.3.000071.

Eitan Edrei et al., Memory-effect based deconvolution microscopy for super-resolution imaging through scattering media, Scientific Reports, (2016), 6:33558, DOI: 10.1038/srep33558.

Kaiming He et al., Single Image Haze Removal Using Dark Channel Prior, IEEE Transactions on Pattern Analysis and Machine Intelligence, vol. 33, No. 12, (Dec. 2011), pp. 23410-2353.

Matthias Hofer et al., Wide field fluorescence epi microscopy behind a scattering medium enabled by speckle correlations, (2018), (12 pages).

Mooseok Jang et al., Relation between speckle decorrelation and optical phase conjugation (OPC)-based turbidity suppression through dynamic scattering media: a study on in vivo mouse skin, Biomedical Optics Express, 72, vol. 6, No. 1, (Jan. 1, 2015), DOI:10.1364/BOE.6.000072.

Diederik P. Kingma et al., ADAM: a Method for Stochastic Optimization, arXiv:1412.6980v9 [cs.LG], (Jan. 30, 2017).

Onur Kulce et al., All-optical information-processing capacity of diffractive surfaces, Light: Science & Applications (2021) 10:25, https://doi.org/10.1038/s41377-020-00439-9.

Yunzhe Li et al., Deep speckle correlation: a deep learning approach toward scalable imaging through scattering media, Optica, vol. 5, No. 10, Oct. 2018, pp. 1181-1190.

Xiaohan Li et al., Single-shot multispectral imaging through a thin scatterer, Optica, vol. 6, No. 7, Jul. 2019, pp. 864-871.

Jingxi Li et al., Class-specific Differential Detection in Diffractive Optical Neural Networks Improves Inference Accuracy, (2019) (21 pages).

Jingxi Li et al., Spectrally encoded single-pixel machine vision using diffractive networks, Sci. Adv. (2021); 7:eabd7690 (11 pages).

Xing Lin et al., All-optical machine learning using diffractive deep neural networks, Science 361, 1004-1008 (2018).

Tairan Liu et al., Deep learning-based holographic polarization microscopy, ACS Photonics (2020) (20 pages).

Yi Luo et al., Design of task-specific optical systems using broadband diffractive neural networks, Light: Science & Applications ( 2019) 8:112 (14 pages).

Deniz Mengu et al., Analysis of Diffractive Optical Neural Networks and Their Integration with Electronic Neural Networks, IEEE J Sel Top Quantum Electron. (2020), 26(1): doi:10.1109/JSTQE.2019.2921376.

Deniz Mengu et al., Misalignment resilient diffractive optical networks, Nanophotonics (2020) (13 pages).

Srinivasa G. Narasimhan et al., Contrast Restoration of Weather Degraded Images, IEEE Transactions on Pattern Analysis and Machine Intelligence, vol. 25, No. 6, (Jun. 2003), pp. 713-724.

Micha Nixon et al., Real-time wavefront-shaping through scattering media by all optical feedback, Nature Photonics (2013) (16 pages).

Md Sadman Sakib Rahman et al., Ensemble learning of diffractive optical networks, Light Science Applications (2021) (22 pages).

Babak Rahmani et al., Multimode Optical Fiber Transmission with a Deep Learning Network, Light Science Applications (2018) (15 pages).

Muhammed Veli et al., Terahertz pulse shaping using diffractive surfaces, Nature Communications, (2021), 12:37, https://doi.org/10.1038/s41467-020-20268-z, www.nature.com/naturecommunications (13 pages).

Tengfei Wu et al., Imaging through a thin scattering layer and jointly retrieving the point-spread-function using phase-diversity, Optics Express, vol. 25, No. 22, (Oct. 30, 2017), pp. 27182-27194.

(56) References Cited

OTHER PUBLICATIONS

Xiaoqing Xu et al., Imaging of objects through a thin scattering layer using a spectrally and spatially separated reference, Optics Express, (2018), (12 pages).

PCT International Preliminary Report on Patentability (Chapter I of the Patent Cooperation Treaty) for PCT/US2022/035615, Applicant: The Regents of the University of California, Form PCT/IB/326 and 373, dated Jan. 24, 2024 (10 pages).

Response to the extended European search report dated Apr. 28, 2025 for European Patent Application No. 22842649, (21 pages).

First Examination Report dated Jul. 7, 2025 for European U.S. Appl. No. 22/842,649, Docket No. 2021-359-2EP (25 pages).

Anonymous: NSF Award Search: Download Awards by Year, National Science Foundation Archives, Feb. 25, 2021, pp. 1-2, XP093290275; retrieved from the Internet: https://web.archive.org/web/20210225091322/https:// www.nsf.gov/awardsearch/download.jsp [retrieved on Jun. 26, 2025].

* cited by examiner

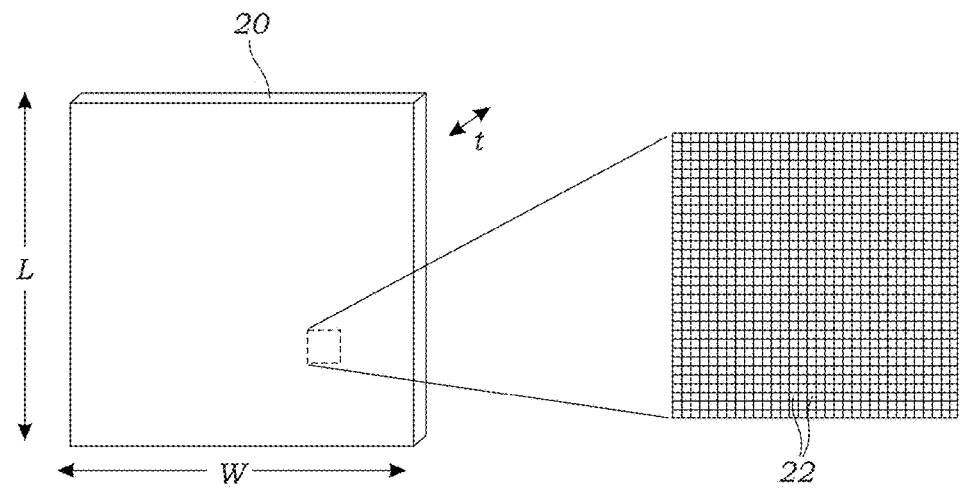
FIG. 3
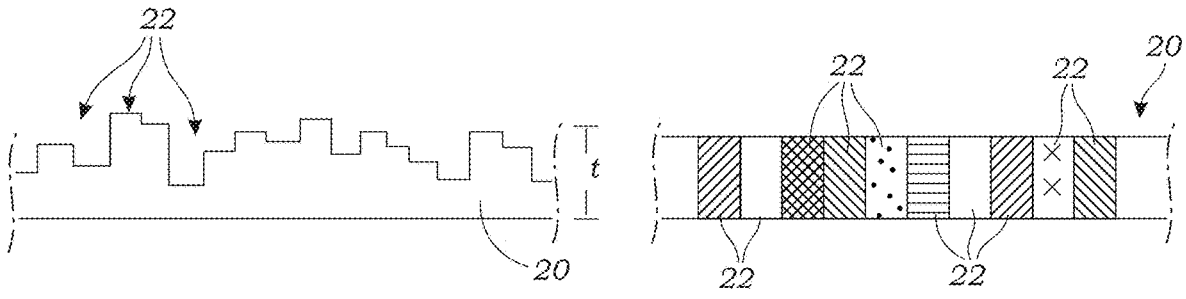
FIG. 4          FIG. 5
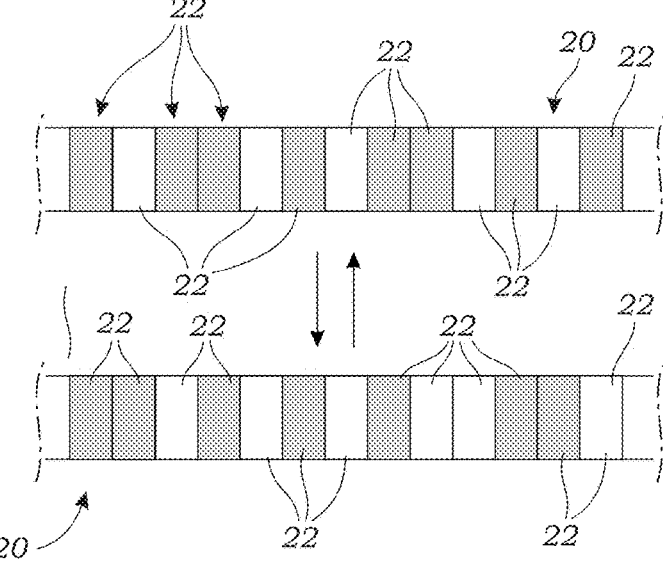
FIG. 6

DIFFRACTIVE OPTICAL NETWORK FOR SEEING THROUGH DIFFUSIVE OR SCATTERING MEDIA

RELATED APPLICATION

This Application is a U.S. National Stage filing under 35 U.S.C. § 371 of International Application No. PCT/US2022/035615, filed on Jun. 29, 2022, which claims priority to U.S. Provisional Patent Application No. 63/220,911 filed on Jul. 12, 2021, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Number 2054102, awarded by the National Science Foundation. The government has certain rights in the invention.

TECHNICAL FIELD

The technical field generally relates to optical-based deep learning physical architectures or platforms that can perform various complex functions and tasks that current computer-based neural networks can implement. The optical deep learning physical architecture or platform has applications in imaging of objects through diffusive media. In particular, the technical field relates to such optical-based architectures and platforms that are trained that can view or process images, optical signals, or optical data that pass through diffusive and/or scattering media.

BACKGROUND

Imaging through scattering and diffusive media has been an important problem for many decades, with numerous solutions reported so far. In various fields, including e.g., biomedical optics, atmospheric physics, remote sensing, astronomy, oceanography as well as autonomous systems and robotics, the capability to rapidly see through diffusive and scattering media is of utmost importance. In principle, with a prior information of the transmission matrix of a diffuser or diffusive medium, the distorted images can be recovered using a computer. However, there is no simple solution to accurately obtain the transmission matrix of a diffuser. Furthermore, the transmission matrix will significantly deviate from its measured function if there are changes in the scattering medium, partially limiting the utility of such measurements to see through unknown, new diffusers. To overcome some of these challenges, adaptive optics-based methods have been applied in different scenarios. With significant advances in wave-front shaping, wide-field real-time imaging through turbid media became possible. These algorithmic methods are implemented digitally using a computer and require guide-stars or known reference objects, which introduce additional complexity to an imaging system. Digital deconvolution using the memory effect with iterative algorithms is another important avenue toward image reconstruction using a computer.

Some of the more recent work on imaging through diffusers has also focused on using deep learning methods to digitally recover the images of unknown objects. Deep learning has been re-defining the state-of-the-art across many areas in optics, including optical microscopy, holography, inverse design of optical devices, optical computation and statistical inference, among others. To incorporate deep learning to digitally reconstruct distorted images, digital neural networks were trained using image pairs composed of diffuser-distorted patterns of objects and their corresponding distortion-free images (target, ground truth). Harvesting the generalization capability of deep neural networks, one can digitally recover an image that was distorted by a new diffuser (never seen in the training phase), by passing the acquired distorted image through a trained neural network using a computer. See e.g., Li et al., Deep speckle correlation: a deep learning approach towards scalable imaging through scattering media, Optica 5, 1181-1190 (2018).

SUMMARY

In one embodiment, a computer-free system and all-optical reconstruction method is disclosed that recovers optical images distorted by unknown, randomly-generated phase diffusers (or diffusive media). Unlike previous digital approaches that utilize computers to reconstruct an image of the input object behind a diffuser, a set of diffractive surfaces/layers were trained (first using a computer) a using deep learning to all-optically reconstruct the image of an unknown object (or reconstruct optical signal/data) as the diffuser-distorted input optical field diffracts through successive trained layers, i.e., the image reconstruction is processed at the speed of light propagation through the diffractive layers. Each diffractive surface that is trained has, in some embodiments, tens of thousands of diffractive features (termed as neurons), where the individual phase values of these neurons are adjusted in the training phase through error back-propagation, by minimizing a customized loss function between the ground truth image and the diffracted pattern at the output field-of-view. During this training, many different, randomly-selected phase diffusers, all with the same statistical correlation length, are used to help the generalization of the final optical network. After this deep learning-based design of these diffractive layers (which is a one-time effort), the physical layers are fabricated to form a physical diffractive optical network that is positioned between an unknown, new diffuser and the output/image plane. As the input light corresponding to a new, unknown object passes through a new or unknown diffuser, the scattered light is collected by the trained diffractive optical network to all-optically reconstruct an image of the object at its output field-of-view, without the need for a computer, any digital computation or an external power source (except for the coherent illumination light which may a natural source in some embodiments).

The success of this approach was validated using coherent THz illumination, and the designed diffractive optical networks were fabricated with a 3D-printer to demonstrate their capability to see through randomly-generated unknown phase diffusers that were never used in the training phase. An improved object reconstruction quality was observed using deeper diffractive optical networks that have additional trainable layers. This all-optical image reconstruction achieved by passive diffractive layers enables one to see objects through unknown random diffusers and presents an extremely low power solution compared with existing deep learning-based or iterative image reconstruction methods implemented using computers, only requiring power for the coherent illumination source. Learning-based diffractive models presented here to see through diffusers can also work at other parts of the electromagnetic spectrum, including the visible (e.g., light with a wavelength in the range of about 380 nm to about 740 nm) and far/mid-infrared wavelengths. This framework can bring transformative advances in various fields, where imaging through diffusive media is of utmost importance such as e.g., in biomedical imaging, astronomy, autonomous vehicles, robotics and defense/security applications, among many others.

In one embodiment, a diffractive optical network that sees through diffusive and/or scattering media to capture accurate optical images, optical signals, or optical data includes one or more optically transmissive substrate layers arranged in an optical path, each of the optically transmissive substrate layer(s) includes a plurality of physical features formed on or within the one or more optically transmissive substrate layers and having different transmission properties as a function of local coordinates across each substrate layer, wherein the one or more optically transmissive substrate layers and the plurality of physical features thereon collectively define a trained mapping function between (1) an input optical image, input optical signal, or input optical data to the diffractive optical network and (2) an output optical image, output optical signal, or output optical data created by optical diffraction through the one or more optically transmissive substrate layers, the trained mapping function reconstructing the optical image, optical signal, or optical data that passes through unknown diffusive and/or scattering media and is projected onto an observation plane and/or one or more optical detectors configured to see or capture the output optical image, output optical signal, or output optical data resulting from the diffractive optical network.

In another embodiment, a diffractive optical network that sees through diffusive and/or scattering media to capture accurate optical images, optical signals, or optical data includes one or more optically reflective substrate layers arranged along an optical path, each of the optically reflective substrate layer(s) includes a plurality of physical features formed on or within the one or more optically reflective substrate layers, and having different reflection properties as a function of local coordinates across each substrate layer, wherein the one or more optically reflective substrate layers and the plurality of physical features collectively define a trained mapping function between (1) an input optical image, input optical signal, or input data to the diffractive optical network and (2) an output optical image, output optical signal, or output optical data from the one or more optically reflective substrate layers, the trained mapping function reconstructing the optical image, optical signal, or optical data that passes through unknown diffusive and/or scattering media and is projected onto an observation plane and/or one or more optical detectors configured to see or capture the output optical image, output optical signal, or output optical data resulting from the diffractive optical network.

In another embodiment, a method of seeing through diffusive and/or scattering media to capture an accurate optical image, optical signal, or optical data includes passing an input optical images, optical signals, or optical data through an unknown diffusive and/or scattering media and into a diffractive optical network includes one or more optically transmissive or reflective substrate layers arranged along an optical path, each of the optically transmissive or reflective substrate layer(s) having a plurality of physical features formed on or within the one or more optically transmissive or reflective substrate layers, and having different transmissive or reflection properties as a function of local coordinates across each substrate layer, wherein the one or more optically transmissive or reflective substrate layers and the plurality of physical features collectively define a trained mapping function between (1) an input optical image, input optical signal, or input data to the diffractive optical network and (2) an output optical image, output optical signal, or output optical data from the one or more optically transmissive or reflective substrate layers, the trained mapping function reconstructing the optical image, optical signal, or optical data that passes through the unknown diffusive and/or scattering media. The output optical image, output optical signal, or output optical data is projected onto an observation plane and/or one or more optical detectors configured to see or capture the output optical image, output optical signal, or output optical data resulting from the diffractive optical network.

In another embodiment, a method of forming a diffractive optical network that sees through diffusive and/or scattering media to capture accurate optical images, optical signals, or optical data includes training with at least one computing device a diffractive optical network model formed by one or more substrate layers to reconstruct an optical image, optical signal, or optical data that passes through the diffusive and/or scattering media that would otherwise degrade the optical image, optical signal, or optical data, the diffractive optical network model having a plurality of optically transmissive and/or optically reflective physical features located in different locations in each of the one or more substrate layers of the network, wherein the training includes feeding an input plane of the diffractive optical network model with training images, training optical signals, or training optical data along with a plurality of different diffusive and/or scattering media, followed by computing an optical output of the diffractive optical network model through optical transmission and/or reflection resulting from the diffractive optical network and iteratively adjusting transmission and/or reflection coefficients for each substrate layer of the diffractive optical network until optimized transmission/reflection coefficients are obtained to reconstruct the optical image, optical signal, or optical data that passes through a new diffusive and/or scattering media. A physical embodiment of the diffractive optical network is then manufactured or fabricated that includes the one or more transmissive and/or reflective substrate layers having physical features that match the optimized transmission/reflection coefficients obtained by the training.

Note that in some embodiments, one or more layers of the diffractive optical network may include reconfigurable features such as, for example, spatial light modulators.

BRIEF DESCRIPTION OF THE DRAWINGS

FIG. 3 illustrates a single substrate layer of a diffractive optical network. The substrate layer may be made from a material that is optically transmissive (for transmission mode such as illustrated in FIG. 1) or an optically reflective material (for reflective mode as illustrated in FIG. 2). The substrate layer, which may be formed as a substrate or plate in some embodiments, has surface features formed across the substrate layer. The surface features form a patterned surface (e.g., an array) having different valued transmission (or reflection) properties as a function of lateral coordinates across each substrate layer. These surface features act as artificial "neurons" that connect to other "neurons" of other substrate layers of the diffractive optical network through optical diffraction (or reflection) and alter the phase and/or amplitude of the light wave.

FIG. 4 schematically illustrates a cross-sectional view of a single substrate layer of a diffractive optical network according to one embodiment. In this embodiment, the surface features are formed by adjusting the thickness of the substrate layer that forms the diffractive optical network. These different thicknesses may define peaks and valleys in the substrate layer that act as the artificial "neurons."

FIG. 5 schematically illustrates a cross-sectional view of a single substrate layer of a diffractive optical network according to another embodiment. In this embodiment, the different surface features are formed by altering the material composition or material properties of the single substrate layer at different lateral locations across the substrate layer. This may be accomplished by doping the substrate layer with a dopant or incorporating other optical materials into the substrate layer. Metamaterials or plasmonic structures may also be incorporated into the substrate layer.

FIG. 6 schematically illustrates a cross-sectional view of a single substrate layer of a diffractive optical network according to another embodiment. In this embodiment, the substrate layer is reconfigurable in that the optical properties of the various artificial neurons may be changed, for example, by application of a stimulus (e.g., electrical current or field). An example includes spatial light modulators (SLMs) which can change their optical properties. In this embodiment, the neuronal structure is not fixed and can be dynamically changed or tuned as appropriate. This embodiment, for example, can provide a learning diffractive optical network or a changeable diffractive optical network that can be altered on-the-fly (e.g., over time) to improve the performance, compensate for aberrations, adjust for dynamic conditions of the diffusive and/or scattering media (e.g., changing over time).

FIG. 15A: After being trained for 100 epochs, all the finalized networks (n=1, 10, 15 and 20) were compared by calculating the average PCC values over unknown objects distorted by all the known diffusers (solid line). Dashed line: the average PCC value over unknown objects distorted by diffusers indexed as 1-99n. Inserts: the same plot zoomed into the last 50 diffusers. FIG. 15B: PCC values of each finalized network tested with images distorted by 10n diffusers used in last 10 epochs in training (n=1, 10, 15 and 20, respectively) and 20 new random diffusers (never seen before). The error bars reflect the standard deviation over different diffusers.

FIG. 16A: output images corresponding to the same input test object imaged through diffractive networks trained with n=1, n=10, n=15 and n=20. Second column: imaged through a known diffuser; third column: imaged through a new diffuser; fourth column: imaged without a diffuser. FIG. 16B: the PCC values corresponding to the networks trained with n=1, 10, 15 and 20 over input test objects distorted by known diffusers, new diffusers, as well as imaged without a diffuser. The error bars reflect the standard deviation over different diffusers.

DETAILED DESCRIPTION OF ILLUSTRATED EMBODIMENTS

Figure 1:
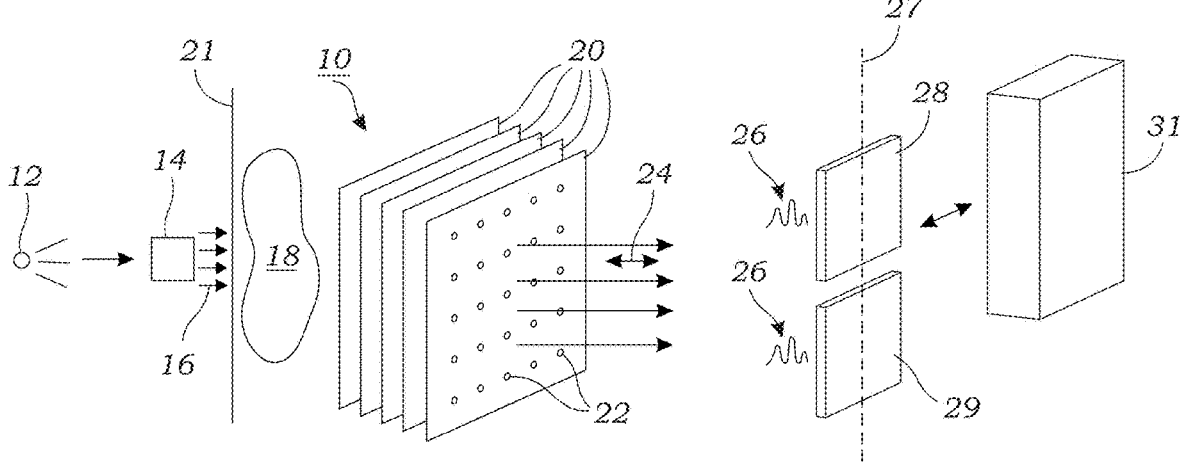
FIG. 1 schematically illustrates one embodiment of a diffractive optical network that is used in transmission mode according to one embodiment. A source of light directs light on or through an object and into the diffractive optical network (or an optical signal/data). In this mode, light passes through the individual substrate layers that form the diffractive optical network. The light that passes through the diffractive optical network generates an output optical image, signal, or data that is captured by one or more detectors or an observation plane or surface.

FIG. 1 schematically illustrates one embodiment of a diffractive optical network 10 that is used in transmission mode according to one embodiment. One or more light source(s) 12 directs light onto an object 14 (either transmission mode or reflection mode as explained herein in more detail) and an optical field 16 from the object 14 then passes through diffusive and/or scattering media 18 before input into the diffractive optical network 10 that contains one or more substrate layers 20 (also sometimes referred to herein as diffractive layers). As explained herein, in one preferred embodiment, there are a plurality of substrate layers 20 used in the diffractive optical network 10. However, in other embodiments, only a single substrate layer 20 may be used. As explained herein, there is a tradeoff in diffractive optical network performance based on the number of substrate layers 20. However, in certain embodiments, only a single substrate layer 20 may produce acceptable results. The optical field 16 generated from the transmitted and/or reflected light from the object(s) 14 creates an input optical field 16 to the diffractive optical network 10 at an input plane 21. The diffusive and/or scattering media 18 is located between the input plane 21 and the substrate layers 20. The diffusive and/or scattering media 18 may include one or more of a solid, liquid, or gas, or combinations thereof. As explained herein, the properties of the diffusive and/or scattering media 18 do not need to be known in advance and may be an unknown diffusive and/or scattering media 18 that was not even specifically used during the training of the diffractive optical network digital model that was used to optimize and generate the design for the physical embodiment of the diffractive optical network 10. The diffusive and/or scattering media 18 may have static properties or one or more properties of the diffusive and/or scattering media 18 may change as a function of time (e.g., density of media, scattering properties, etc.).

The diffractive optical network 10 contains one or more substrate layers 20 that are physical layers which may be formed as a physical substrate or matrix of optically transmissive material (for transmission mode) or optically reflective material (for reflective mode). In transmission mode light or radiation passes through the substrate layer(s) 20. Conversely, in reflective mode, light or radiation reflects off the substrate layer(s) 20. Exemplary materials that may be used for the substrate layers 20 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. Metal coated materials may be used for reflective substrate layers 20. Light may emit directly from a light source 12 or multiple light sources 12 (or object 14) and proceed directly into the diffractive optical network 10. Alternatively, light from the light source(s) 12 may pass through and/or reflect off an object 14, medium, or the like prior entering the diffractive optical network 10. When the light source(s) 12 is/are used as part of the diffractive optical network 10, the light source(s) 12 may be artificial (e.g., light bulb, laser, light emitting diodes, laser diodes, etc.) or the light source(s) 12 may include natural light such as sunlight or other naturally occurring electromagnetic wavelength(s).

As explained herein, the diffractive optical network 10 is able to see through the diffusive and/or scattering media 18 which would otherwise obscure or distort the image of the object 14 (e.g., optical image) and reconstruct an accurate view the optical image that substantially mitigates the obscuring or distortion of the optical image due to the diffusive and/or scattering media 18. While the input optical field 16 that enters the diffractive optical network 10 is described in the context of FIG. 1 as containing an optical image (i.e., image of object 14) it should be appreciated that the input optical field 16 may also include optical signals or optical data that do not necessarily originate or emanate from an object 14. For example, an optical signal or optical data which passes through diffusive and/or scattering media 18 and is obscured or distorted can be reconstructed by the diffractive optical networks 10 described herein. Thus, the input optical field 16 may include one or more input optical images, optical signals, or optical data.

Figure 2:
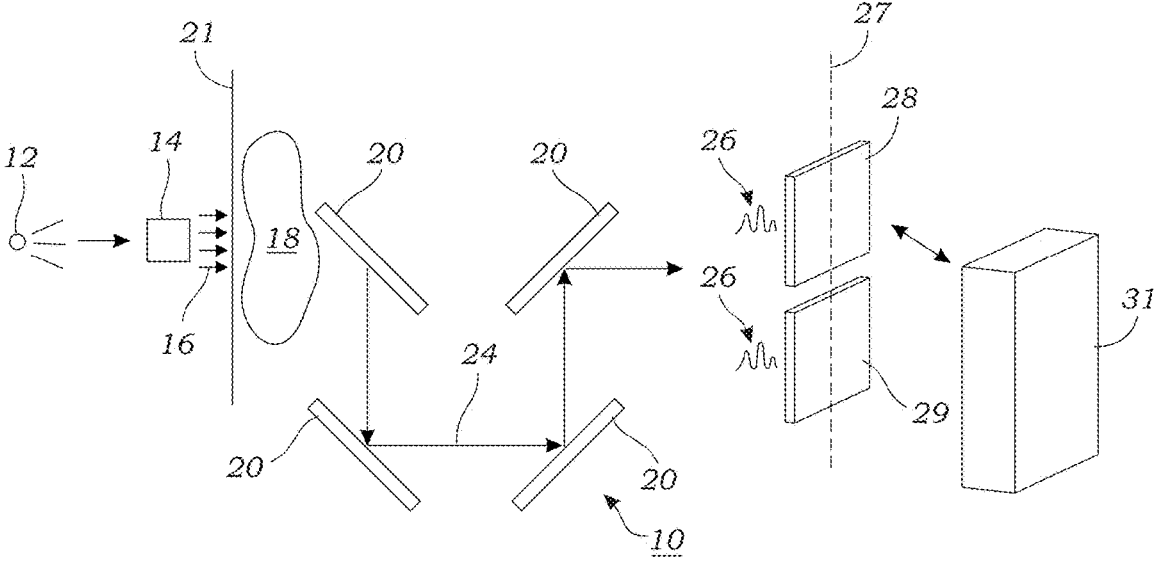
FIG. 2 schematically illustrates another embodiment of a diffractive optical network that is used in reflection mode according to one embodiment. In this mode, light reflects off the individual substrate layers that form the diffractive optical network. The reflected light from the diffractive optical network generates an output optical image, signal, or data that is captured by one or more detectors or an observation plane or surface.

With reference to FIGS. 3-6, each substrate layer 20 of the diffractive optical network 10 has a plurality of physical features 22 formed on the surface of the substrate layer 20 or within the substrate layer 20 itself that collectively define a pattern of physical locations along the length and width of each substrate layer 20 that have varied transmission properties (or varied reflection properties for the embodiment of FIG. 2). The physical features 22 formed on or in the substrate layers 20 thus create a pattern of physical locations within the substrate layers 20 that have different valued transmission properties as a function of lateral coordinates (e.g., length and width and in some embodiments depth) across each substrate layer 20. In some embodiments, each separate physical feature 22 may define a discrete physical location on the substrate layer 20 while in other embodiments, multiple physical features 22 may combine or collectively define a physical region with a particular transmission (or reflection) property. The one or more substrate layers 20 arranged along the optical path 24 (FIG. 1) collectively generate an output optical image, optical signal, or data 26 at an output plane 27. As explained herein the one or more optical detectors 28 or an observation plane 29 may be located at the output plane 27 to capture or see the output optical image, optical signal, or data 26.

The pattern of physical locations formed by the physical features 22 may define, in some embodiments, an array located across the surface of the substrate layer 20. With reference to FIG. 3, the substrate layer 20 in one embodiment is a two-dimensional generally planer substrate having a length (L), width (W), and thickness (t) that all may vary depending on the particular application. In other embodiments, the substrate layer 20 may be non-planer such as, for example, curved. In addition, while FIG. 3 illustrates a rectangular or square-shaped substrate layer 20 different geometries are contemplated. With reference to FIG. 1 and FIG. 3, the physical features 22 and the physical regions formed thereby act as artificial "neurons" that connect to other "neurons" of other substrate layers 20 of the diffractive optical network 10 (as seen, for example, in FIGS. 1 and 2) through optical diffraction (or reflection in the case of the embodiment of FIG. 2) and alter the phase and/or amplitude of the light wave. The particular number and density of the physical features 22 or artificial neurons that are formed in each substrate layer 20 may vary depending on the type of application. In some embodiments, the total number of artificial neurons may only need to be in the hundreds or thousands while in other embodiments, hundreds of thousands or millions of neurons or more may be used. Likewise, the number of substrate layers 20 that are used in a particular diffractive optical network 10 may vary although it typically ranges from at least one substrate layer 20 to less than ten substrate layers 20.

As seen in FIG. 1, the output optical image, signal, or data 26 that is generated at the output plane 27 is/are captured by one or more optical detectors 28. The optical detector(s) 28 may include, for example, an optical image sensor (e.g., CMOS image sensor or image chip such as CCD), photo-detectors (e.g., photodiode such as avalanche photodiode detector (APD)), photomultiplier (PMT) device, and the like. The photodetectors may be arranged in an array in some embodiments. In some embodiments, there are multiple optical detectors 28. These may be discrete optical detectors 28 or they may even be certain pixels on a larger array such as CMOS image sensor that act as individual sensors. In some embodiments, there may be a single optical detector 28 that is scanned along the output plane 27 to capture the full output optical image, signal, or data 26 that is generated by the diffractive optical network 10. The one or more optical detectors 28 may, in some embodiments, be coupled to a computing device 31 as seen in FIGS. 1 and 2 (e.g., a computer or the like such as a personal computer, laptop, server, mobile computing device) that is used to acquire, store, process, manipulate, analyze, and/or transfer the output optical image, signal, or data 26. In other embodiments, the optical detector(s) 28 may be integrated within a device such as a diffractive camera that is configured to acquire, store, process, manipulate, analyze, and/or transfer the output optical image, signal, or data 26. In some embodiments, the optical detector(s) 28 may be associated with an aperture. An opaque layer having one or more apertures (not shown) formed therein may be interposed between the last of the substrate layers 20 and the optical detector(s) 28.

In some embodiments, the optical sensor(s) 28 (e.g., optical image sensor or photodetectors) may be omitted and the output optical image, signal, or data 26 that is generated by the diffractive optical network 10 is projected onto a surface or observation plane 29. The surface or observation plane that the output optical image, signal, or data 26 is projected on may include, for example, an eye.

FIG. 2 schematically illustrates one embodiment of a diffractive optical network 10 that is used in reflection mode. Similar components and features shared with the embodiment of FIG. 1 are labeled similarly. In this embodiment, the object(s) 14 is/are illuminated with light from the light source 12 as described previously to generate an input optical field/image 16. Of course, while the input optical field 16 that enters the diffractive optical network 10 is described in the context of FIG. 2 as containing an optical image (i.e., image of object 14) it should be appreciated that the input optical field 16 may also include optical signals or optical data that do not necessarily originate or emanate from an object 14.

This input object field/image 16 is input to the diffractive optical network 10. In this embodiment, the diffractive optical network 10 operates in reflection mode whereby light is reflected by a plurality of substrate layers 20 (which could also be a single layer 20 in some embodiments). As seen in the embodiment of FIG. 2, the optical path 24 is a folded optical path as a result of the reflections off the plurality of substrate layers 20. The number of substrate layers 20 may vary depending on the particular function or task that is to be performed as noted above. Each substrate layer 20 of the diffractive optical network 10 has a plurality of physical features 22 formed on the surface of the substrate layer 20 or within the substrate layer 20 itself that collectively define a pattern of physical locations along the length and width of each substrate layer 20 that have varied reflection properties. Like the FIG. 1 embodiment, the output optical image, signal, or data 26 at the output plane 27 is captured by one or more optical detectors 28. The one or more optical detectors 28 may be coupled to a computing device 31 as noted. As an alternative to the one or more optical detectors 28, the output optical image, signal, or data 26 may be projected onto a surface or observation plane 29.

While FIG. 2 illustrates an embodiment of a diffractive optical network 10 that functions in reflection mode, it should be appreciated that in other embodiments the diffractive optical network 10 is a hybrid that includes aspects of a transmission mode of FIG. 1 and the reflection mode of FIG. 2. In this hybrid embodiment, the light from the input optical field/image 16 transmits through one or more substrate layers 20 and also reflects off one or more substrate layers 20.

FIG. 4 illustrates one embodiment of how different physical features 22 are formed in the substrate layer 20. In this embodiment, a substrate layer 20 has different thicknesses (t) of material at different lateral locations along the substrate layer 20. In one embodiment, the different thicknesses (t) modulate the phase of the light passing through the substrate layer 20. This type of physical feature 22 may be used, for instance, in the transmission mode embodiment of FIG. 1. The different thicknesses of material in the substrate layer 20 forms a plurality of discrete "peaks" and "valleys" that control the transmission properties of the neurons formed in the substrate layer 20. The different thicknesses of the substrate layer 20 may be formed using additive manufacturing techniques (e.g., 3D printing) or lithographic methods utilized in semiconductor processing. For example, the design of the substrate layer(s) 20 may be stored in a stereolithographic file format (e.g., .stl file format) which is then used to 3D print the substrate layer(s) 20. Other manufacturing techniques include well-known wet and dry etching processes that can form very small lithographic features on a substrate layer 20. Lithographic methods may be used to form very small and dense physical features 22 on the substrate layer 20 which may be used with shorter wavelengths of the light. As seen in FIG. 4, in this embodiment, the physical features 22 are fixed in permanent state (i.e., the surface profile is established and remains the same once complete).

FIG. 5 illustrates another embodiment in which the physical features 22 are created or formed within the substrate layer 18. In this embodiment, the substrate layer 20 may have a substantially uniform thickness but have different regions of the substrate layer 20 have different optical properties. For example, the refractive (or reflective) index of the substrate layer(s) 20 may be altered by doping the substrate layer(s) 20 with a dopant (e.g., ions or the like) to form the regions of neurons in the substrate layer(s) 20 with controlled transmission properties (or absorption and/or spectral features). In still other embodiments, optical nonlinearity can be incorporated into the deep optical network design using various optical non-linear materials (e.g., crystals, polymers, semiconductor materials, doped glasses, polymers, organic materials, semiconductors, graphene, quantum dots, carbon nanotubes, and the like) that are incorporated into the substrate layer 20. A masking layer or coating that partially transmits or partially blocks light in different lateral locations on the substrate layer 20 may also be used to form the neurons on the substrate layer(s) 20.

Alternatively, the transmission function of the physical features 22 or neurons can also be engineered by using metamaterial or plasmonic structures. Combinations of all these techniques may also be used. In other embodiments, non-passive components may be incorporated in into the substrate layer(s) 20 such as spatial light modulators (SLMs). SLMs are devices that impose spatial varying modulation of the phase, amplitude, or polarization of light. SLMs may include optically addressed SLMs and electrically addressed SLM. Electric SLMs include liquid crystal-based technologies that are switched by using thin-film transistors (for transmission applications) or silicon backplanes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

FIG. 6 schematically illustrates a cross-sectional view of a single substrate layer 20 of a diffractive optical network 10 according to another embodiment. In this embodiment, the substrate layer 20 is reconfigurable in that the optical properties of the various physical features 22 that form the artificial neurons may be changed, for example, by application of a stimulus (e.g., electrical current or field). An example includes spatial light modulators (SLMs) discussed above which can change their optical properties. In other embodiments, the layers may use the DC electro-optic effect to introduce optical nonlinearity into the substrate layer(s) 20 of a diffractive optical network 10 and require a DC electric-field for each substrate layer 20 of the diffractive optical network 10. This electric-field (or electric current) can be externally applied to each substrate layer 20 of the diffractive optical network 10. Alternatively, one can also use poled materials with very strong built-in electric fields as part of the material (e.g., poled crystals or glasses). In this embodiment, the neuronal structure is not fixed and can be dynamically changed or tuned as appropriate (i.e., changed on demand). This embodiment, for example, can provide a learning diffractive optical network 10 or a changeable diffractive optical network 10 that can be altered on-the-fly to capture/reject different object classes, improve the performance, compensate for aberrations, or even change another task.

The diffractive optical network 10 described herein is used to reconstruct an optical image, optical signal, or optical data that has passed through unknown diffusive and/or scattering media. The reconstruction process substantially mitigates or overcomes any image distortions or aberrations that result from the optical input optical field 16 passing through the unknown diffusive and/or scattering media.

Figure 7:
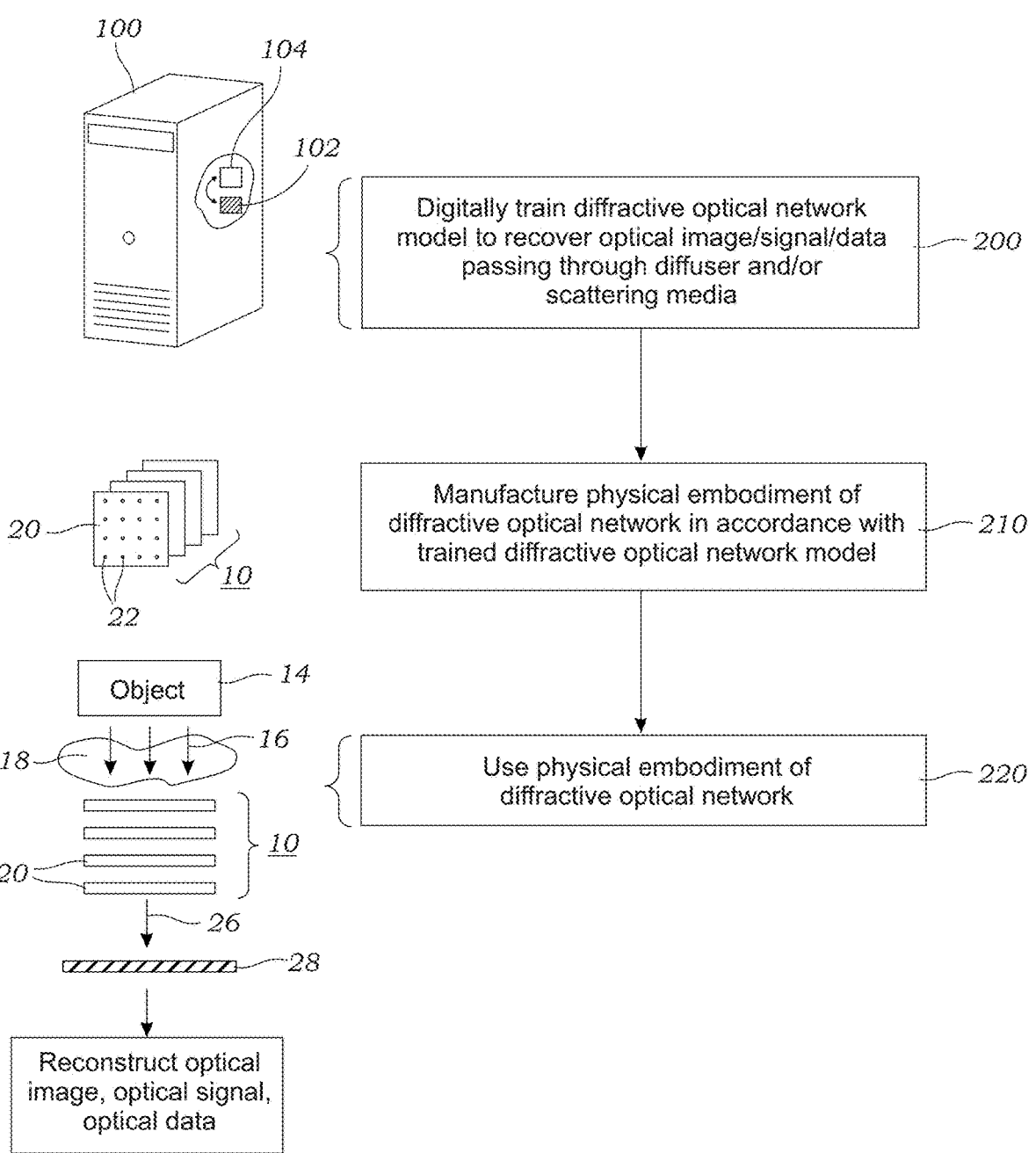
FIG. 7 illustrates a method of digitally training a model of diffractive/reflective layers to recover actual image/data passing through diffusive and/or scattering media. Once the training is complete, the physical embodiment of the diffractive optical network is then manufactured or fabricated for use.

FIG. 7 illustrates a flowchart of the operations or processes according to one embodiment to create and use the diffractive optical network 10 of the type disclosed herein. As seen in operation 200 of FIG. 7, a computing device 100 having one or more processors 102 executes software 104 to then digitally train a model or mathematical representation of single or multi-layer diffractive and/or reflective substrate layers 20 used within the diffractive optical network 10 to digitally train a diffractive optical network model to recover optical image(s), signal(s), or data 26 passing through diffusive and/or scattering media 18. This training establishes the particular transmission/reflection properties of the physical features 22 and/or neurons formed in the substrate layer(s) 20 to recover the optical image(s), signal(s), or data 26 passing through diffusive and/or scattering media 18. Different diffusive and/or scattering media 18 are used during this training process. This may include between 2 and 1,000 different diffusive and/or scattering media 18. The different diffusive and/or scattering media 18 that are used to train the diffractive optical network model may have the same or similar statistical correlation length.

Next, using the established optimized model and design for the physical embodiment of the diffractive optical network 10, the actual substrate layer(s) 20 used in the physical diffractive optical network 10 are then manufactured in accordance with the model or design (operation 210). The design, in some embodiments, may be embodied in a software format (e.g., SolidWorks, AutoCAD, Inventor, or other computer-aided design (CAD) program or lithographic software program) and may then be manufactured into a physical embodiment that includes the one or more substrate layers 20 having the tailored physical features 22 formed therein/thereon. The physical substrate layer(s) 20, once manufactured may be mounted or disposed in an optional holder 30 such as that illustrated in FIG. 8. The holder 30 may include a number of slots 32 formed therein to hold the individual substrate layer(s) 20 in the required sequence and with the required spacing between adjacent layers (if needed). The holder 30 or something similar may be integrated into a device such as a camera or the like to hold the substrate layer(s) 30. Once the physical embodiment of the diffractive optical network 10 has been made, the diffractive optical network 10 is then used to reconstruct or recover accurate optical image(s), signal(s), or data 26 passing through diffusive and/or scattering media 18 as illustrated in operation 220 of FIG. 7.

Figure 8:
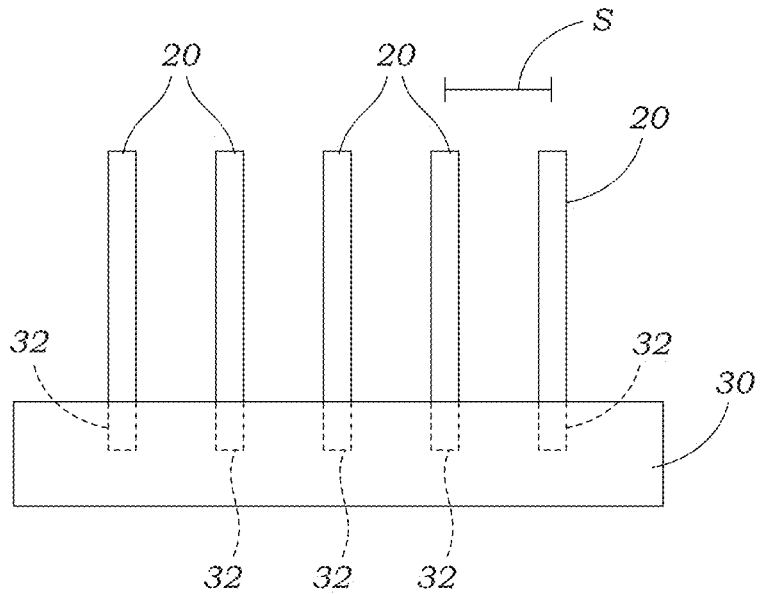
FIG. 8 illustrates an embodiment of a holder that is used to secure the substrate layers used in a diffractive optical network.

As noted above, the particular spacing of the substrates 20 that make the diffractive optical network 10 may be maintained using the holder 30 of FIG. 8 (or something similar inside a camera or other device). The holder 30 may contact one or more peripheral surfaces of the substrate layer(s) 20. In some embodiments, the holder 30 may contain a number of slots 32 that provide the ability of the user to adjust the spacing (S) between adjacent substrate layers 20. In some embodiments, the substrate layers 20 may be permanently secured to the holder 30 while in other embodiments, the substrate layers 20 may be removable from the holder 30. The one or more substrate layers 20 may be positioned within and/or surrounded by vacuum, air, a gas, a liquid, or a solid material. This material may be the same as or different from the diffusive and/or scattering media 18. The diffractive optical network 10 is preferably vaccinated during the training phase to accommodate potential misalignments. For example, the physical diffractive optical network 10 may be used in an application where physical forces are present that could result in object or signal transformations. Environmental conditions may also create object transformations. The physical diffractive optical network 10 is able to tolerate these transformations without sacrificing performance of the physical diffractive optical network 10.

The diffractive optical networks 10 described herein includes one or more substrate layers 20. When a plurality of such substrate layers 20 are used, they are spaced apart from one another. In the experiments described herein, the one or more substrate layers 20 are transmissive to light whereby light diffracts as it passes through the various substrate layer(s) 20 and interacts with the neurons contained therein. In other embodiments, the substrate layer(s) 20 may include reflective layer(s) 20 where light reflects of the surface(s) thereof. Each substrate 20 of the diffractive optical network 10 has a plurality of physical features 22 formed on the surface of the substrate layer 20 or within the substrate layer 20 itself that collectively define a pattern of physical locations along the length and width of each substrate layer 20 that have varied transmission coefficients (or varied reflection coefficients for a reflection embodiment). The physical features 22 formed on or in the substrate layer(s) 20 thus create a pattern of physical locations within the layer(s) 20 that have different transmission coefficients as a function of local coordinates (e.g., length and width and in some embodiments depth) across each substrate layer 20. In some embodiments, each separate physical feature 22 may define a discrete physical location on the substrate layer while in other embodiments, multiple physical features 22 may combine or collectively define a physical region with a particular transmission coefficient.

The one or more substrate layers 22 are arranged along an optical path 24 and collectively define a trained mapping function between an input optical field 16 that includes an optical image, signal, or data to the one or more layers 20 and an output optical image, signal, or optical data 26 created by optical diffraction through the one or more substrate layers 20 (or reflection from the one or more substrate layers 20). The output optical image, signal, or data is detected by one or more optical detectors 28. This may include stationary detector(s) 28 or moveable detector(s) 28. As explained herein, in the experimental embodiment, the one or more detectors 28 is/are moveable in the x and y directions (orthogonal to optical path 24). The detector(s) 28 may also include an array of fixed detectors 28 or an imaging chip (e.g., CMOS) that captures images on pixels.

In some embodiments, the one or more detectors 28 are omitted and instead, the diffractive optical network 10 reconstructs or recovers the optical image, signal, or data 26 that passes through new or unknown diffusive and/or scattering media 18 and is projected onto an observation plane 29. An observer (e.g., the eye(s) of a person), lens/lens set, or screen may be located at the observation plane 29 so that the optical image, signal, or data 26 can be observed or viewed. In some embodiments, the output optical image, signal, or data 26 is an object classification decision which is projected onto one or more optical detectors 28 or onto an output observation plane 29. For example, the location of the one or more optical detectors 28 that receive light or light of a certain amplitude may correspond to a particular object classification.

As explained herein, the design or physical embodiment of the diffractive optical network 10 is able to recover the proper or actual optical image, signal, or data 26 despite the light from the object, signal, or data having passed through diffusive and/or scattering media 18. The diffusive and/or scattering media 18 may include a solid media, liquid media, gaseous media, or combinations thereof. Importantly, the diffractive optical network 10 works even with diffusive and/or scattering media 18 that is different from (i.e., new or unknown) the diffusive and/or scattering media 18 that the diffractive optical network 10 designed was digitally trained on. In some embodiments, the diffusive and/or scattering media 18 (training or new/unknown) changes as a function of time. For example, this may include a gas or fluid that changes its diffusive and/or scattering properties as a function of time.

Results

Figures 9A, 9B:
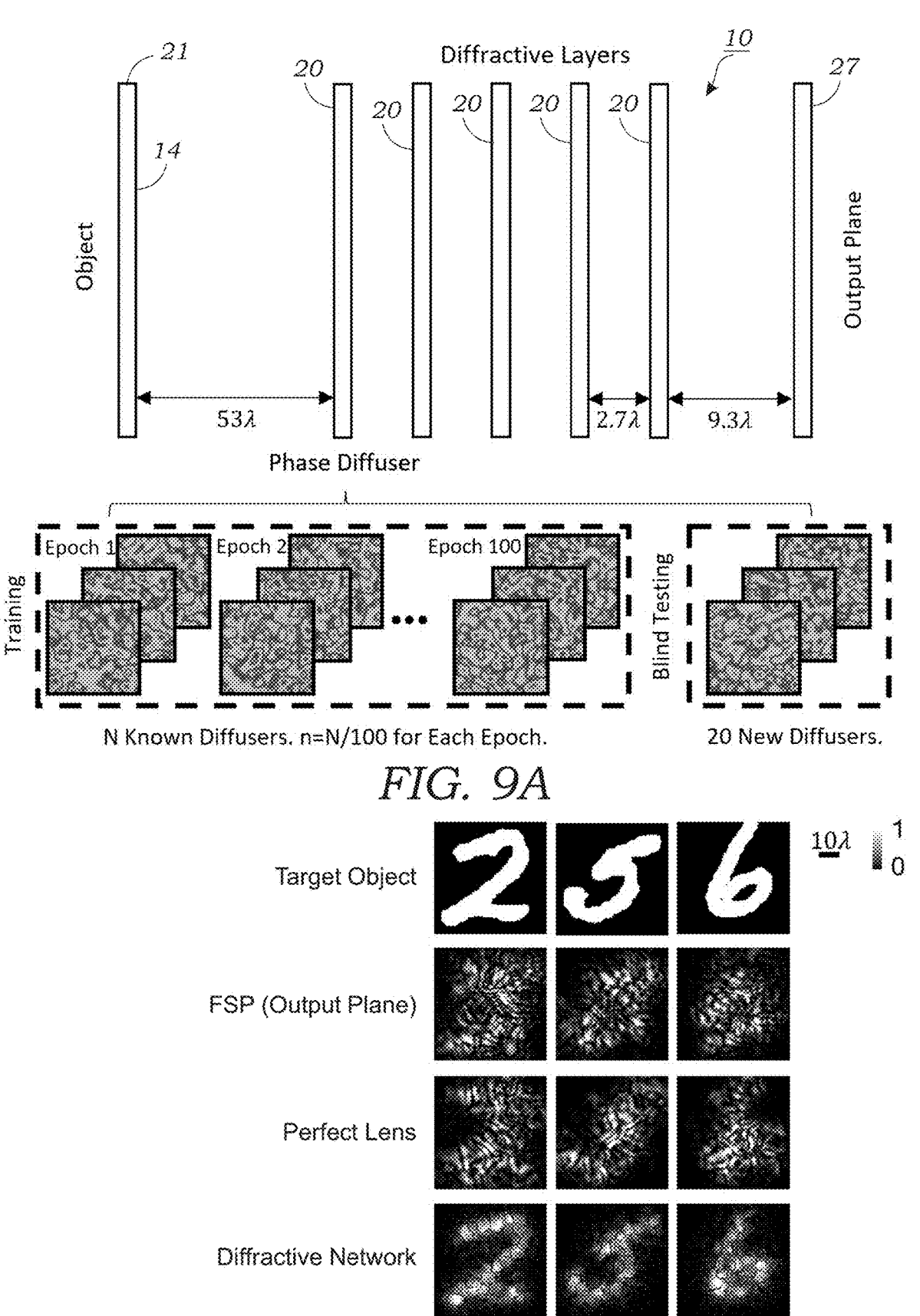
FIG. 9A illustrates the training and design schematic of a 4-layered diffractive system that can see through unknown/new randomly generated phase diffusers.
FIG. 9B illustrates sample images showing the image distortion generated by random diffusers. Top: input images. Second row: free-space propagation (FSP) of the input objects through the diffuser, without the diffractive layers, imaged at the output plane. Third row: the input objects imaged by an aberration-free lens through the diffuser. Fourth row: the outputs of the trained diffractive network.

Diffractive Optical Network Design and Experimental Set-Up 3D-fabricated diffractive optical networks 10 were designed and manufactured that can all-optically reconstruct optical images 26 that are distorted by random phase diffusers made from diffusive and/or scattering media 18 under 400 GHz illumination ($\lambda \approx 0.75$ mm). In terms of the optical set-up, custom fabricated phase diffusers (see the Methods section) are individually placed 40 mm ($53\lambda$) away from the input object plane 21. The successive diffractive layers 20 (designed for all-optical reconstruction of the object field-of-view) are placed 2 mm away from the diffuser, with a layer-to-layer distance of 2 mm. The output image plane 27 is positioned 7 mm ($9.3\lambda$) from the last diffractive layer 20 along the optical axis 24 (FIG. 9A). Based on these parameters, characteristic object distortion generated by a randomly selected phase diffuser is reported in FIG. 9B. First, the free-space propagation (FSP) of a distorted object (i.e., seen through a diffuser) was simulated without the presence of the diffractive layers 20, and got its intensity distribution at the output plane 27, which is shown in the second row of FIG. 9B. Imaging of the same object through the same diffuser by an aberration-free lens is also shown in the third row of FIG. 9B. These images clearly show the impact of the diffuser at the output plane (through free-space propagation or an imaging lens), which makes it impossible to recognize the object unless further computation or digital reconstruction is applied. As reported herein, jointly-trained passive diffractive surfaces can perform this needed computation all-optically, as the scattered light behind an unknown diffuser passes through these layers 20, forming an image of the object field-of-view at its output plane 27, as exemplified in the fourth row of FIG. 9B.

A diffractive optical network 10 generalizes to see through unknown, new diffusive and/or scattering media 18 (e.g., different diffusers) by training its substrate layers 20 with numerous image pairs, diffuser-distorted speckle patterns of various input objects 14 and the corresponding distortion-free optical images (target). To make the all-optical diffractive system capable of reconstructing an unknown object's image that is distorted by new diffusive and/or scattering media 18 (e.g., diffusers—i.e., never seen during the training phase), the strategy of using multiple diffusers to train the diffractive surfaces was adopted, following the procedure depicted in FIG. 9A. All of the diffusers that are used in the training and blind testing phases are assumed to have the same correlation length ($L \sim 10\lambda$) and are randomly created as thin phase elements (see the Methods section and FIG. 1(a)). At the beginning of each training epoch, a set of n different phase diffusers are initialized to be used throughout the whole epoch. In each iteration within a given epoch, a batch of B grayscale training images from the MNIST dataset (containing 50,000 handwritten digits for training and 10,000 for testing) was randomly selected and used them, one by one, through the amplitude channel of the input object plane 21. During each iteration, a total of B×n distorted optical fields 16 were processed by the diffractive optical network model and subsequently measured at the output plane 27. The corresponding loss value, calculated through a training loss function that blends negative Pearson Correlation Coefficient (PCC) and photon loss (see the Methods section), was then used to calculate the error gradients for updating the phase modulation values of the neurons on the diffractive layers, marking the end of one iteration. An epoch was finished when all the 50,000 training images within the MNIST dataset were exhausted to train the diffractive optical network model. After being trained for 100 epochs, the network has seen features from a total of N=100n unique phase diffusers that are randomly generated. This strategy enabled the generalization of the diffractive optical network 10 to see and reconstruct unknown objects 14 through novel/new phase diffusers that were never used in the training phase.

All-Optical, Computer-Free Image Reconstruction Through Diffusers

Figure 9C:
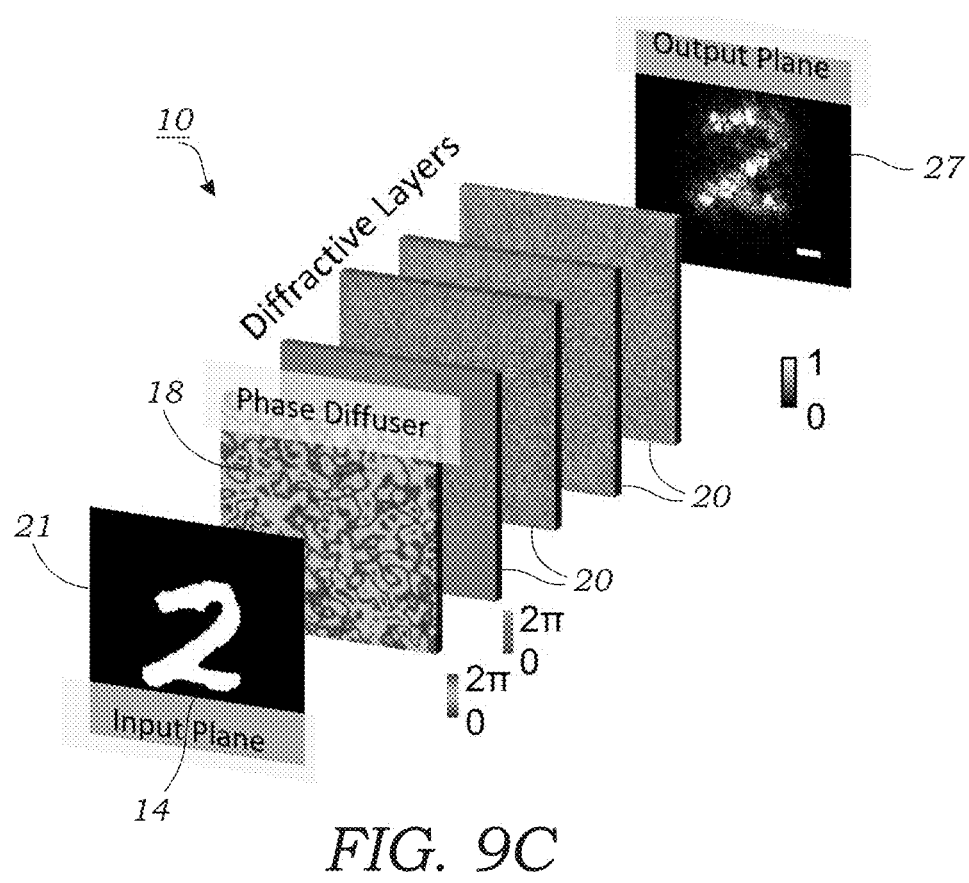
FIG. 9C schematically illustrates a 4-layered network trained to all-optically reconstruct the input field of view seen through an unknown random diffuser.
Figure 10:
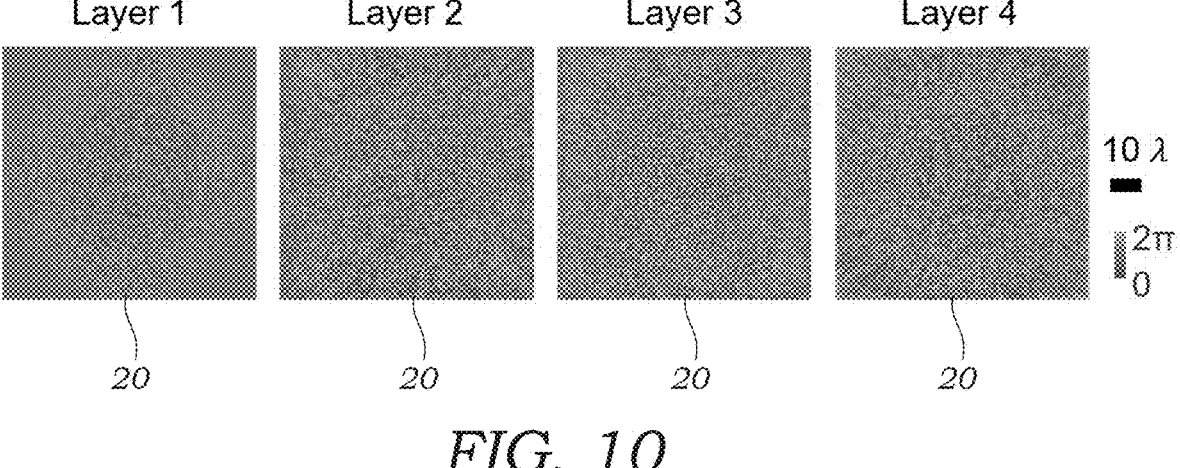
FIG. 10 illustrates the phase patterns of the transmissive layers corresponding to the diffractive network that was trained using n=20 diffusers at each epoch.
Figure 11:
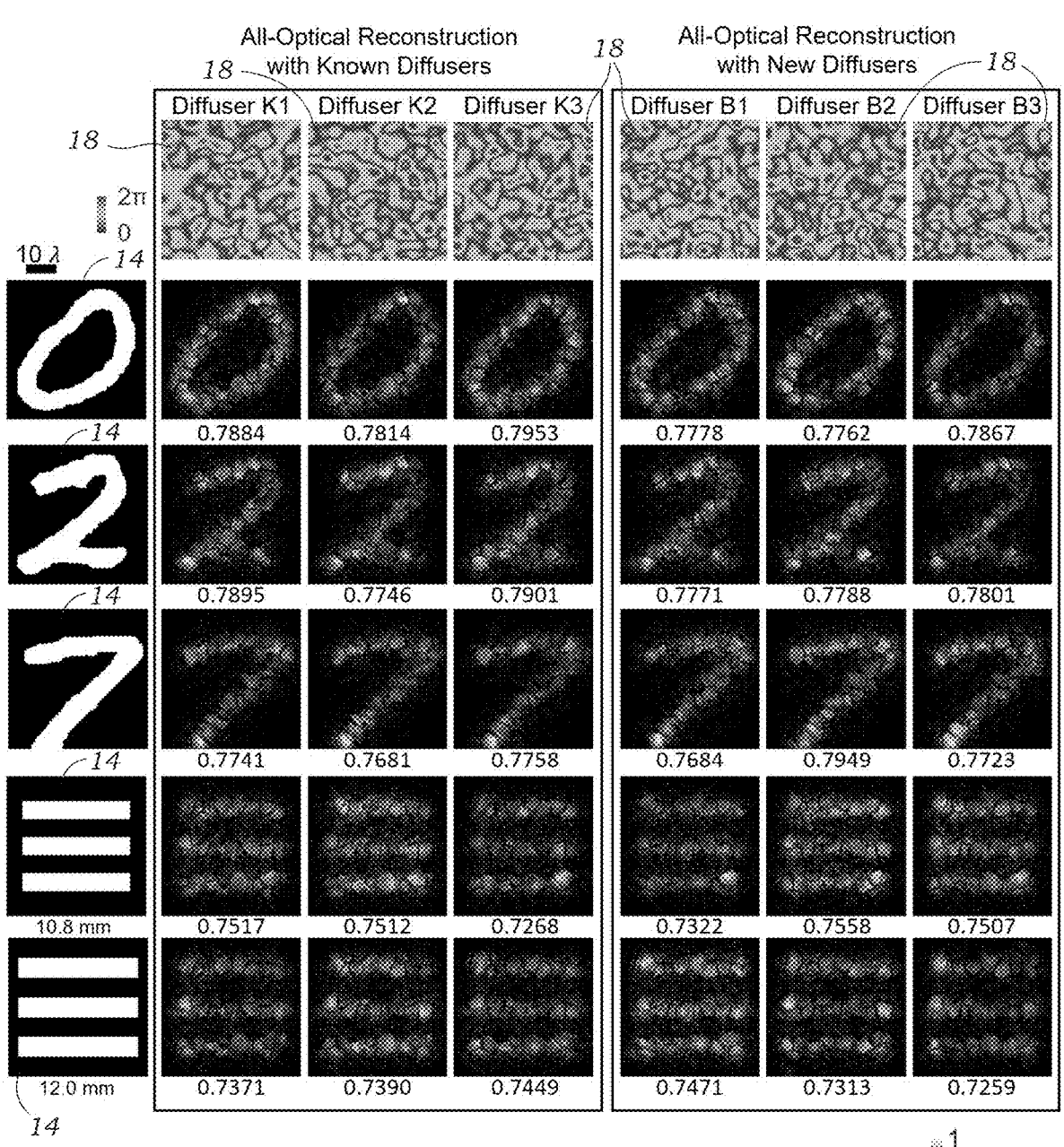
FIG. 11 illustrates simulation results of the all-optically reconstructed images of test objects distorted by known diffusers (left) and new diffusers (right) using the trained diffractive network shown in FIG. 9C. The PCC value of each reconstruction is reported below the corresponding image.

To demonstrate the all-optical image reconstruction performance of a diffractive optical network 10, a 4-layered network using n=20 diffusers in each epoch (FIG. 9C) was first trained. After being trained for 100 epochs, the resulting network model generalized to an imaging system that can see through diffusers at the speed of light, without the need for a computer or a digital reconstruction algorithm. The trained diffractive layers' phase modulation patterns are reported in FIG. 10. To shed light on the operation principles of the trained diffractive network 10, it was initially tested with new hand-written digits (i.e., MNIST test images that were never used in the training phase) distorted by n=20 individual diffusers that were used in the last training epoch (these are referred to as known diffusers, meaning they were used in the training). The first three rows in FIG. 11 present the successful all-optical reconstruction results corresponding to these new hand-written digits that were distorted by three (K1, K2 and K3) of the last n=20 known diffusers. Next, the same trained diffractive network was blindly tested with new phase diffusers that were not used during the training. For this, 20 novel/new diffusers were randomly generated and FIG. 11 shows the all-optical reconstruction results of the same objects 14 (never seen by the network before) distorted by unknown/new diffusers (B1, B2 and B3), which were randomly selected from the 20 new phase diffusers. A comparison between the known diffusers and new diffusers images of FIG. 11 reveals the generalization performance of the trained diffractive network 10 to all-optically reconstruct unknown objects through unknown phase diffusers that were never seen before.

Figure 12A:
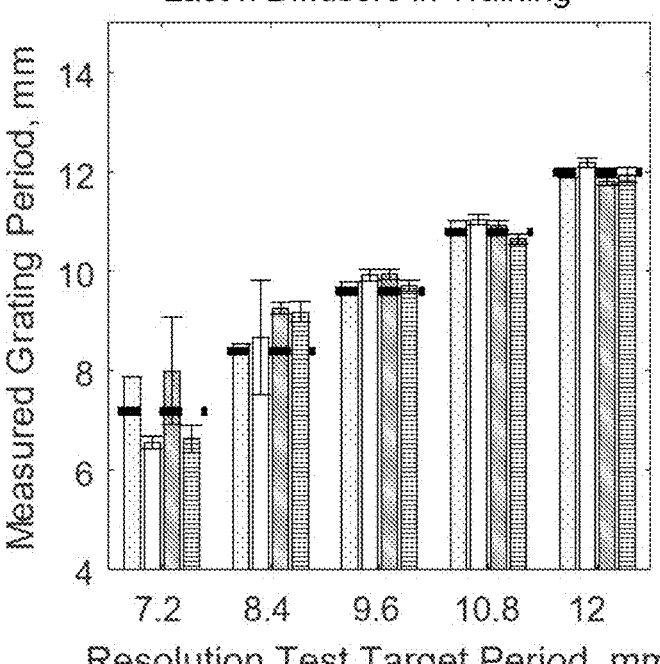
FIGS. 12A and 12B: Illustrate the generalization of diffractive networks that were trained with MNIST image data to reconstruct the images of different resolution test targets, seen through known (FIG. 12A) and new randomly generated diffusers (FIG. 12B). Despite the fact that such resolution test targets or similar line-based objects were never seen by the networks during their training, their periods are successfully resolved at the output plane of the diffractive networks.
Figure 12B:
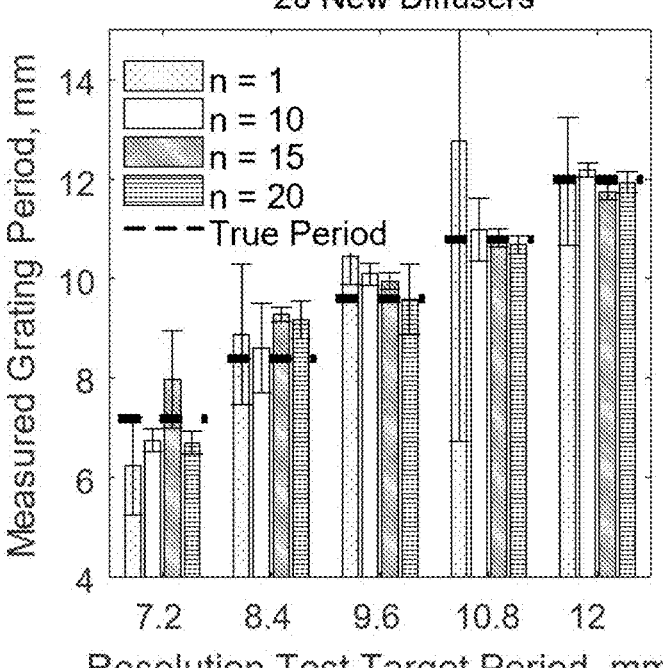

In addition to MNIST test images, the same diffractive network 10 was further tested with resolution test targets having different periods (10.8 mm and 12 mm respectively); see FIG. 11 last 2 rows. These types of resolution test targets, composed of periodic lines, were never seen by the diffractive optical network 10 before (which was trained with only MNIST data), and their successful reconstruction at the network output plane 27 (FIG. 11) further supports the generalization of the diffractive optical network's capability to reconstruct any arbitrary object positioned at the input plane 21 or input field-of-view, instead of overfitting to a local minimum covering only images from a specific dataset. To quantitatively analyze the generalization performance of trained diffractive optical networks 10, in FIGS. 12A and 12B the measured periods corresponding to the all-optically reconstructed images of different resolution test targets that were seen through the last n known diffusers (used in the last training epoch) are reported as well as 20 new, randomly generated diffusers (never used during the training). Despite the use of different training strategies (with n=1, 10, 15, 20), the results reported in FIGS. 12A and 12B reveal that all these trained diffractive network models can resolve and accurately quantify the periods of these resolution test targets seen through known as well as new/novel diffusers.

Figure 9D:
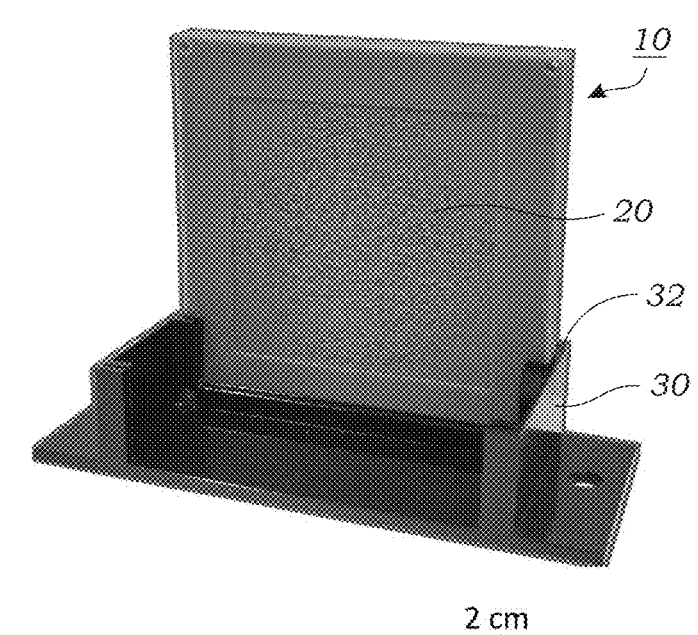
FIG. 9D is a photograph of the 3D printed network shown in FIG. 9C.
Figure 13:
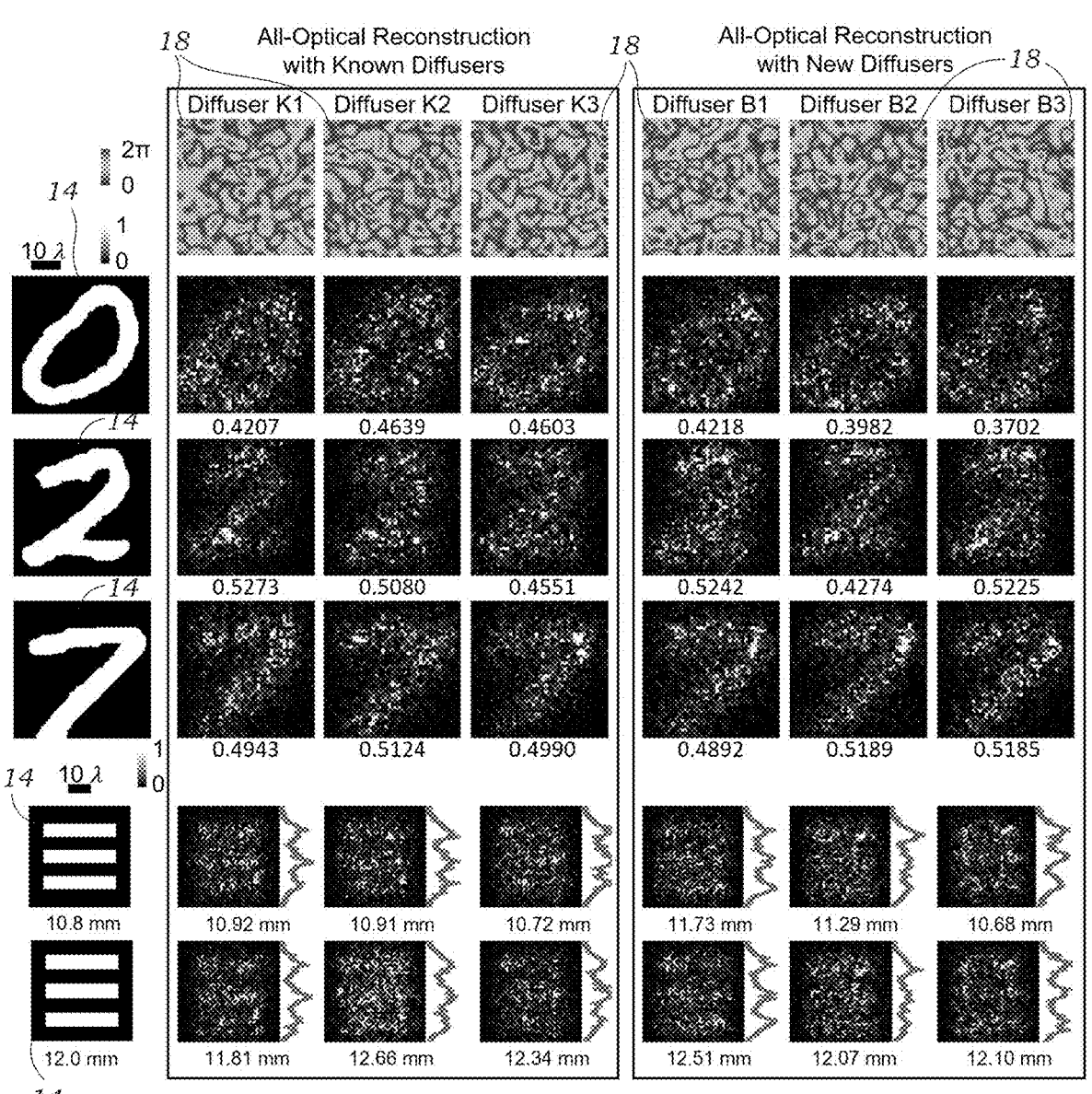
FIG. 13 illustrates experimental results of the all-optically reconstructed images of test objects distorted by known (left) and new (right) diffusers using the trained diffractive network shown in FIG. 9C. The PCC value of each measured image is shown below each image for the numerical input objects (second through fourth rows). The measured periods of the resolution test targets imaged through known and unknown diffusers are labeled below each image in the last two rows (horizontal lines as input image).
Figure 14:
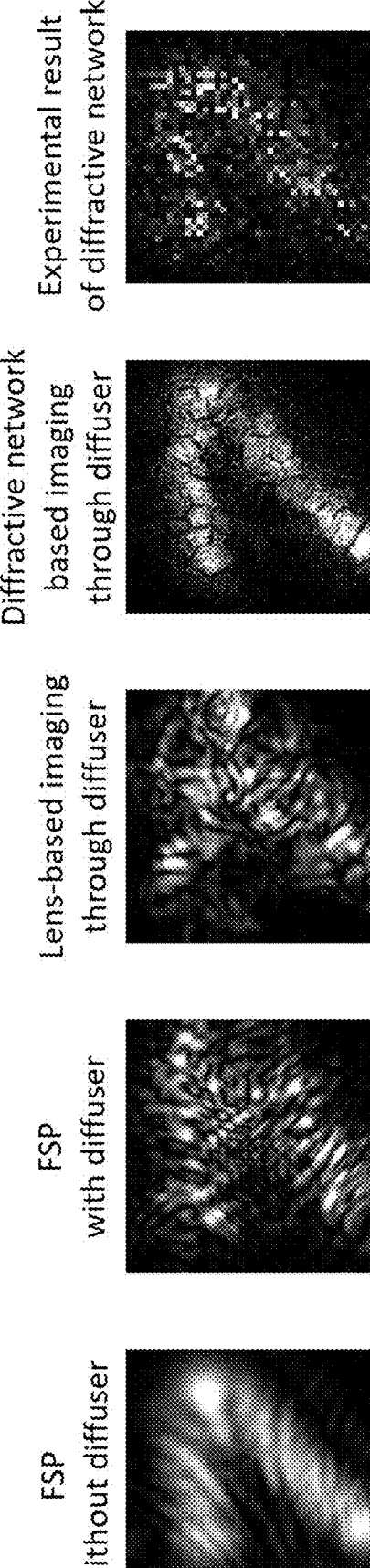
FIG. 14: Numerical and experimental results showing the image distortion generated by a random phase diffuser. To exemplify the image distortion generated by a phase diffuser, the intensity distribution at the output field-of-view was numerically simulated as a result of the free space propagation (FSP) of the input object '7', without and with the presence of the diffuser K1 that was randomly generated (first and second panels in the second row, respectively); imaging of the same input object through the diffuser using an aberration-free lens is also shown in the third panel. All-optical reconstruction of the trained diffractive network and its experimental counterpart are also shown in the last two panels on the right. For better visualization, the contrast of all the panels is enhanced using the default MATLAB function (imadjust).

After these numerical analyses of all-optical image reconstruction under different conditions, next its performance was experimentally verified and fabricated the designed diffractive layers 20 using a 3D printer (FIG. 9D): diffusers K1-K3 and B1-B3 were fabricated as well as 5 test objects 14 (3 hand-written digits and 2 resolution test targets). The test objects 14 were further coated using aluminum foil to provide binary transmittance. For each hand-written digit, a 42×42 mm field-of-view at the output plane 27 was imaged by scanning (x, y directions) a 0.5×0.25 mm detector 28 with a step size of 1 mm in each direction (see FIG. 9E). The experimental results are shown in FIG. 13, clearly demonstrating the success of the all-optical network's 10 capability to see through unknown diffusers. For comparison, the intensity distribution generated by a lens-based imaging system is also reported as well as free-space propagation (without the diffractive layers) of an input object 14 with the presence of the diffuser K1 (see FIG. 14); a similar comparison is also provided in FIG. 9B. These comparisons clearly highlight the success of the image reconstruction achieved by the diffractive optical network 10 despite the presence of significant image distortion caused by the unknown diffusive and/or scattering media 18 (i.e., diffuser) and free-space propagation.

Resolution test targets were also imaged using the same experimental setup at the output plane of the diffractive optical network 10 (see FIG. 13 bottom two rows). From the all-optically reconstructed output images 26 of the diffractive optical network 10, the periods of the resolution test targets imaged through known and (new/novel) diffusers as 10.851±0.121 mm (11.233±0.531 mm) and 12.269±0.431 mm (12.225±0.245 mm) were measured, corresponding to the fabricated resolution test targets with periods of 10.8 mm and 12 mm, respectively. These experimental results further demonstrate the generalization capability of the trained diffractive optical network 10 to all-optically reconstruct/image unknown objects 14 through unknown diffusers, which were never used during the training phase; moreover, it should be emphasized that this fabricated diffractive optical network 10 design was only trained with MNIST image data, without seeing grating-like periodic structures of FIG. 13 (bottom two rows).

Several factors affect the experimental performance of the diffractive optical network 10 that was tested. First, the incident THz wave is not completely uniform at the input object plane 21 due to the practical limitations of the THz source 12 that was used, deviating from the assumption of plane wave incidence. Second, potential fabrication imperfections and the mechanical misalignments between successive diffractive layers 20 as they are assembled together might have also partially degraded the experimental results, compared with the numerical test results. Finally, since the random diffuser layer 18 strongly diffracts light, the experiments might also suffer from reduced signal-to-noise ratio at the detector 28.

Figure 15A:
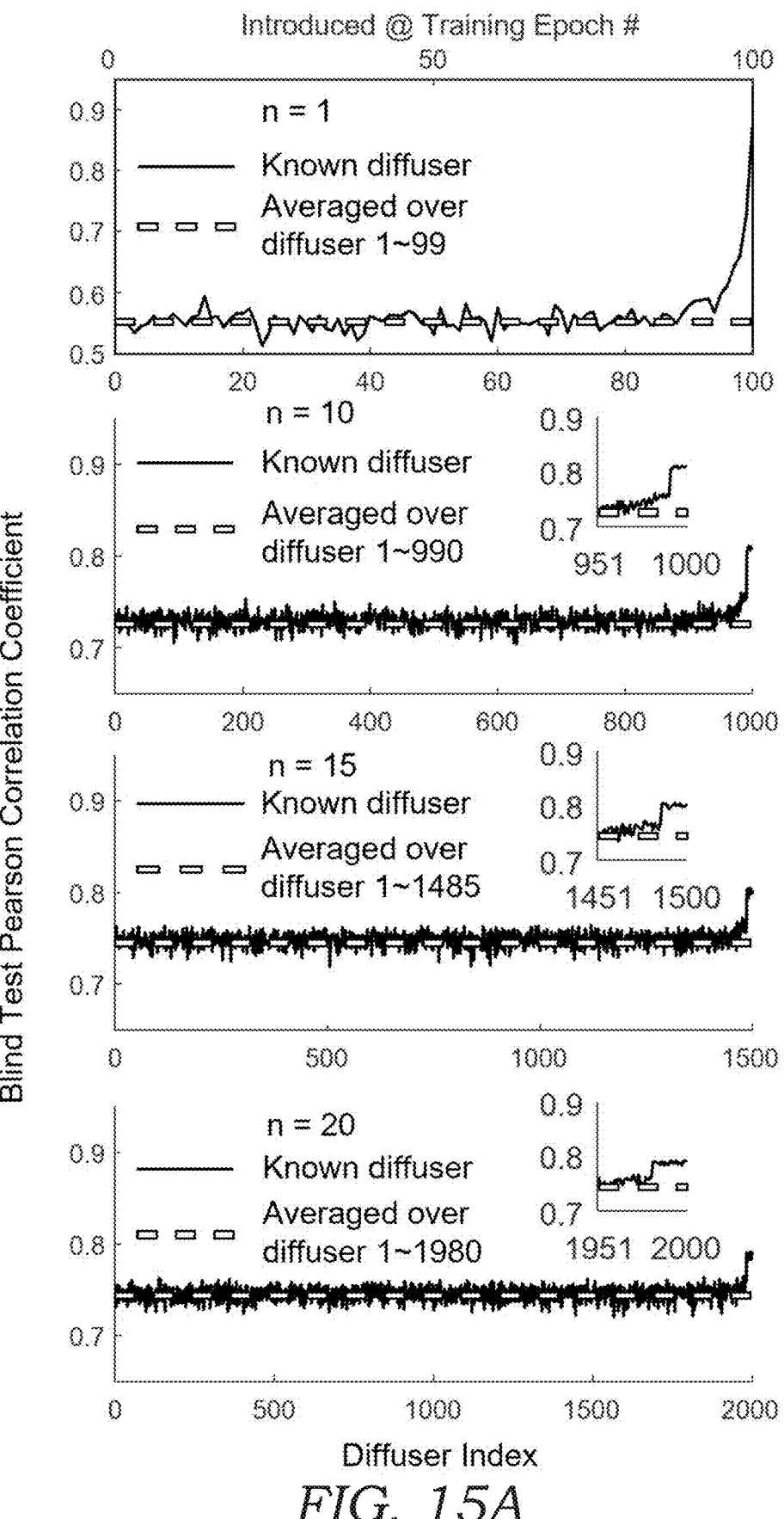
FIGS. 15A and 15B illustrate the memory of diffractive networks.

Performance of all-Optical Image Reconstruction as a Function of the Number of Independent Diffusers Used in the Training An important training parameter to be further examined is the number of diffusers (n) used in each epoch of the training. To shed more light on the impact of this parameter, the all-optical reconstruction performance of four different diffractive optical networks trained with n=1, n=10, n=15 and n=20 were compared, while keeping all the other parameters the same. To further quantify the image reconstruction performance of these trained diffractive networks, the Pearson Correlation Coefficient (PCC) was adopted as a figure of merit, defined as:

$$P = \frac{\sum (O - \bar{O}) \cdot (G - \bar{G})}{\sqrt{\sum (O - \bar{O})^2 \cdot \sum (G - \bar{G})^2}} \tag{1}$$

where O is the output image 26 of the diffractive network and G is object image 16 to be reconstructed, i.e., the ground truth. Using this metric, the mean PCC value was calculated for the all-optical reconstruction of 10,000 MNIST test objects 14 (never used in the training) distorted by the same diffusers. Stated differently, after being trained for 100 epochs, all the finalized networks (n=1, 10, 15, 20) were compared to each other by calculating the average PCC values over unknown MNIST test objects distorted by each one of the 100n known diffusers as well as each one of the 20 new/novel randomly generated diffusers (see FIGS. 15A, 15B). These FIGS. should not be confused with learning curves typically used to monitor the ongoing training of a neural network model; in fact, the results in FIGS. 15A, 15B report the all-optical reconstruction fidelity/quality achieved for unknown test objects after the training is complete. From top to bottom, the four panels in FIG. 15A present the comparison of the diffractive networks trained with n=1, n=10, n=15 and n=20, respectively, while the inserts in last three panels show the same plot zoomed into the last 50 diffusers. An increased PCC value can be clearly observed corresponding to testing of unknown objects through the last n diffusers used in the final epoch of the training. Furthermore, it was observed that the trained diffractive models treat all the diffusers used in the previous epochs (1-99) on average the same (dashed lines in FIG. 15A), while the diffusers used in the last epoch (100) are still part of the "memory" of the network as it shows better all-optical reconstruction of unknown test objects through any one of the last n diffusers used in the training. Interestingly, due to the small learning rate used at the end of the training phase (~3×10⁻⁴, see the Methods section for details), the diffractive network trained with n=1 maintained a fading memory of the last 10 known diffusers. However, this memory did not provide an additional benefit for generalizing to new, unknown diffusers.

Figure 15B:
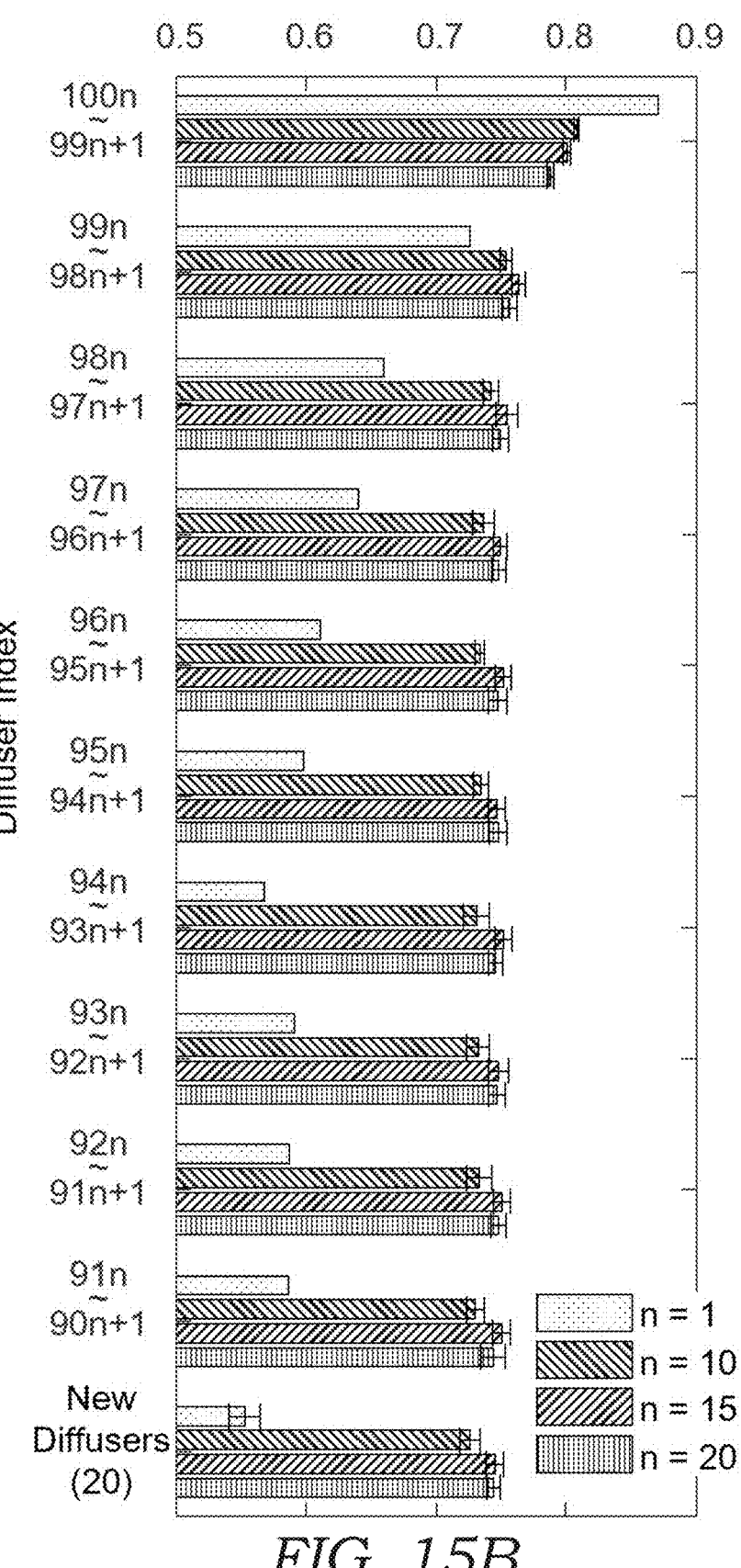

Another important observation is that the all-optical reconstruction performance of these trained networks models to image unknown test objects 14 through new diffusers is on par with the reconstruction of test objects seen through the diffusers used in epochs 1 through 99 (see FIG. 15B). These results, along with FIGS. 11, 12A, 12B, 13, clearly show that these trained diffractive optical networks 10 have successfully generalized to reconstruct unknown test objects 14 through new random diffusers, never seen before. FIG. 15B further illustrates that the training strategies that used n=10, n=15 and n=20 perform very similar to each other and are significantly superior to using n=1 during the training, as the latter yields relatively inferior generalization and poorer all-optical reconstruction results for unknown new diffusers, as also confirmed in FIGS. 16A, 16B.

Figure 16A:
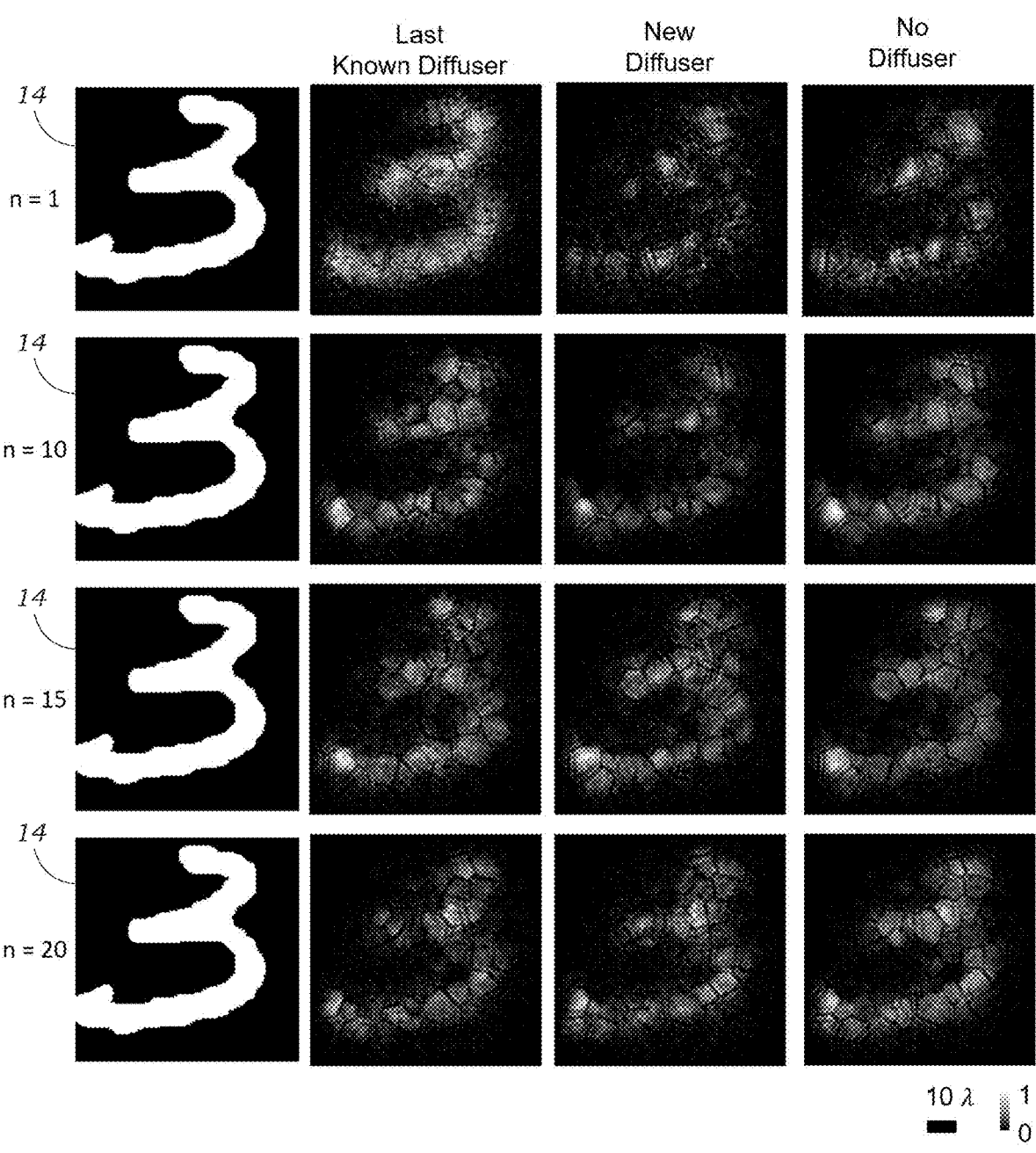
FIGS. 16A-16B shows a comparison of diffractive network output images under different conditions.
Figure 16B:
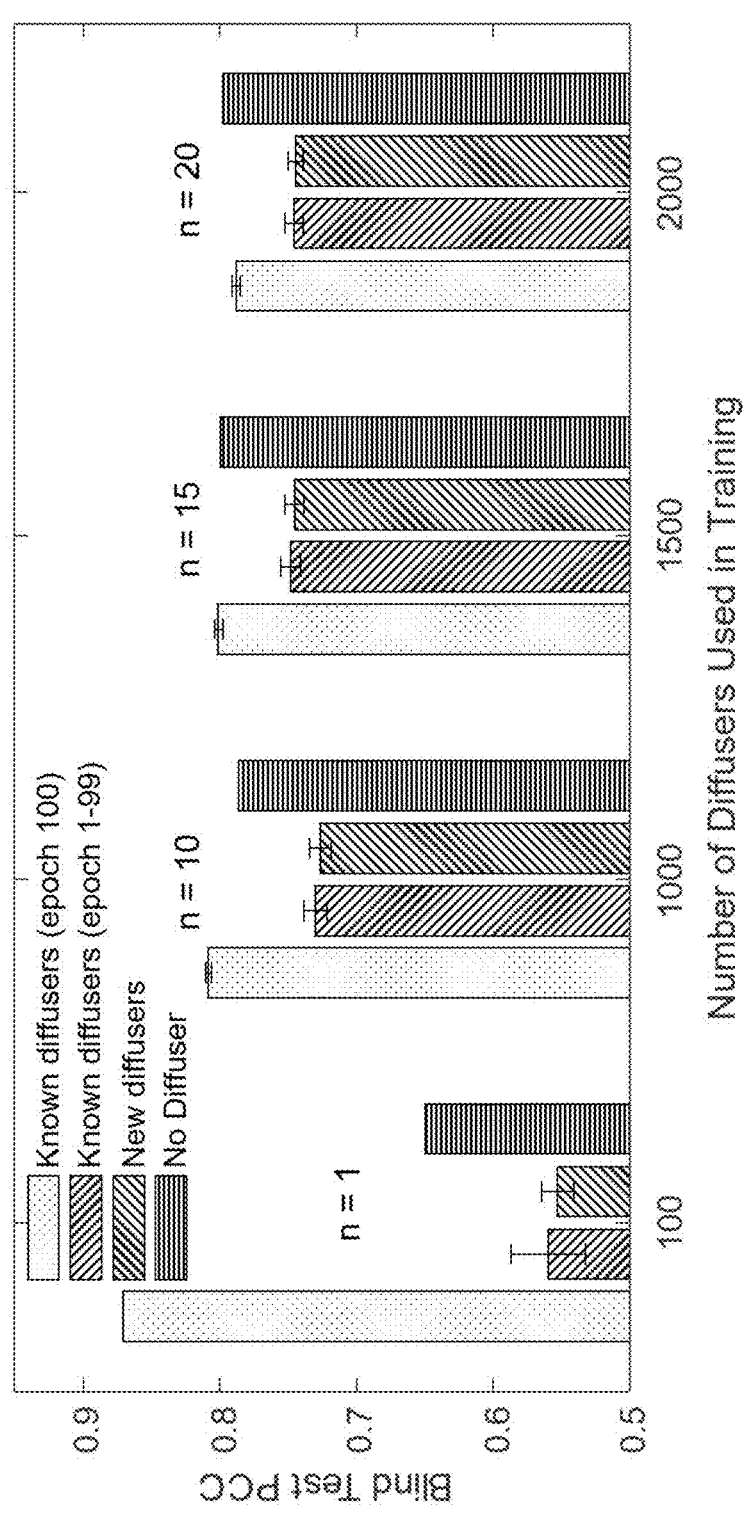

To shed more light on the operation principles of the designed diffractive optical networks 10, the same networks were tested to image distortion-free objects, and therefore removed the random phase diffuser in FIG. 9A while keeping all the other components at their corresponding locations; see FIGS. 16A and 16B for the resulting images and the PCC values corresponding to the same networks trained with n=1, n=10, n=15 and n=20. The fourth column in FIG. 16A visually illustrates the diffracted images formed at the output field-of-view of each network, without a diffuser present, demonstrating that the networks indeed converged to a general-purpose imager, as also further confirmed by the increased PCC values reported in FIG. 16B for the cases without a diffuser. In other words, the diffractive optical network 10 converged to an imager design with built-in resilience against distortions created by random, unknown phase diffusers, as also confirmed by the increased PCC values reported in FIG. 16B for the cases without a diffuser.

It is also worth noting that, the diffractive network model trained with n=1 diffuser per epoch had an easier time to overfit to the last diffuser used during the training phase, and therefore it scored higher when imaging through this last known diffuser (FIG. 16B). This is a result of overfitting, which is also evident from its poorer generalization performance under new diffusers as compared to the training strategies that used n=10, n=15 and n=20 diffusers per epoch (see FIG. 16B).

Deeper Diffractive Networks Improve all-Optical Image Reconstruction Fidelity

Figure 17:
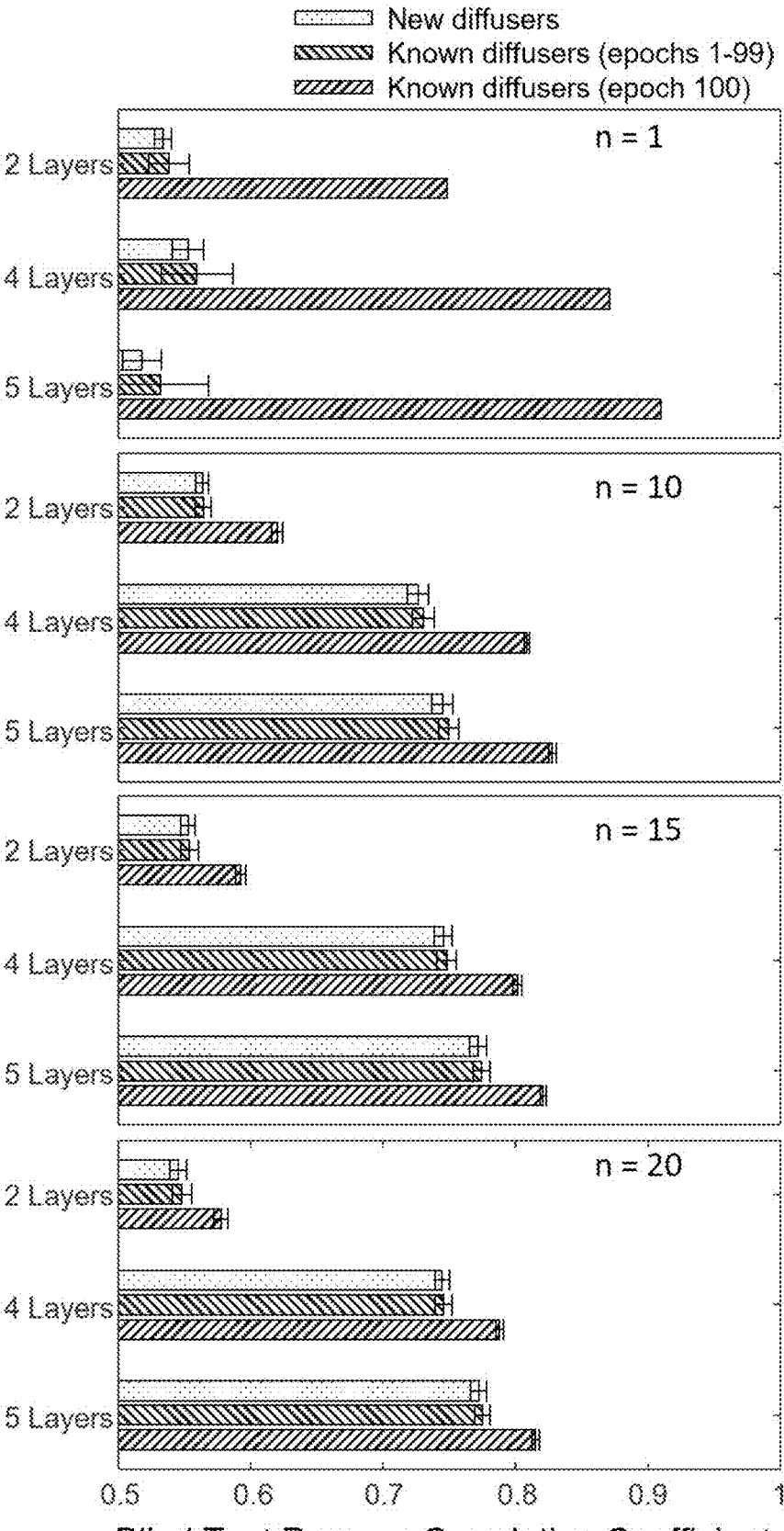
FIG. 17 illustrates how additional trainable diffractive surfaces improve the all-optical image reconstruction of objects seen through unknown random diffusers (blind test PCC values as a function of layers). The error bars reflect the standard deviation over different diffusers.

The impact of deeper diffractive network models that are composed of a larger number of trainable diffractive surfaces were analyzed on their all-optical reconstruction and generalization performance to see through diffusers. FIG. 17 compares the average PCC values for the all-optical reconstruction of unknown test objects using diffractive network models that are designed with different number of diffractive layers 20. The results reveal that, with additional trainable diffractive layers 20, the average PCC values calculated with test images distorted by both known and new random diffusers increase, demonstrating a depth advantage for all-optical image reconstruction.

Figure 19:
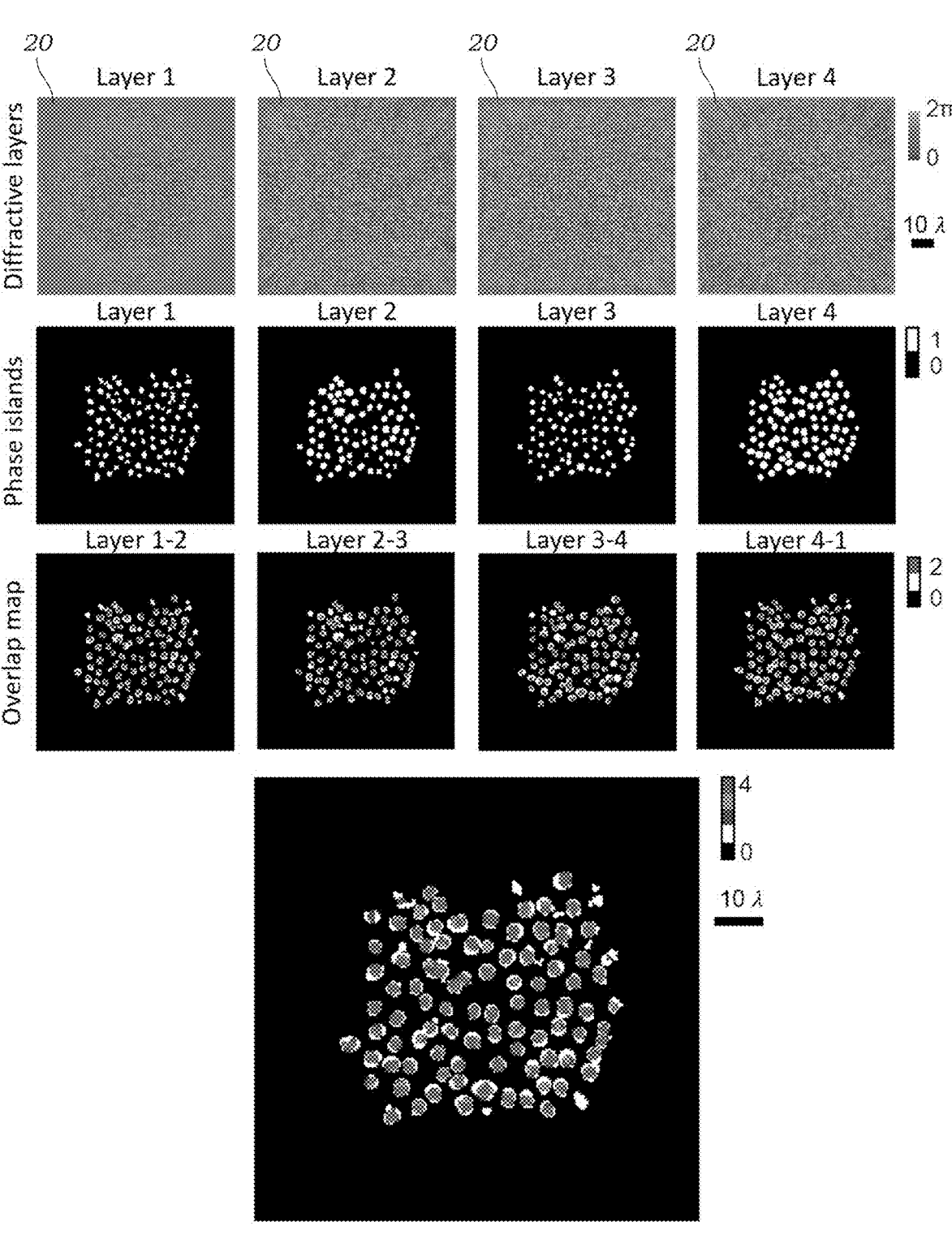
FIG. 19 illustrates the overlap map of phase islands on successive diffractive layers. After training, the converged diffractive layers consist of multiple smooth phase islands, as shown in the first row. Layers corresponding to the diffractive network that was trained using n=20 diffusers at each epoch were used here as an example. Binary spatial maps were generated to mark the locations of these phase islands on each layer (second row). The summation of two consecutive spatial maps was used to illustrate the overlap between the phase islands on successive diffractive layers (as well as between phase islands on the first and last layers), as displayed in the third row with the overlapped regions. Similarly, an overlap map among all four diffractive layers is depicted in the last row.
Figure 20:
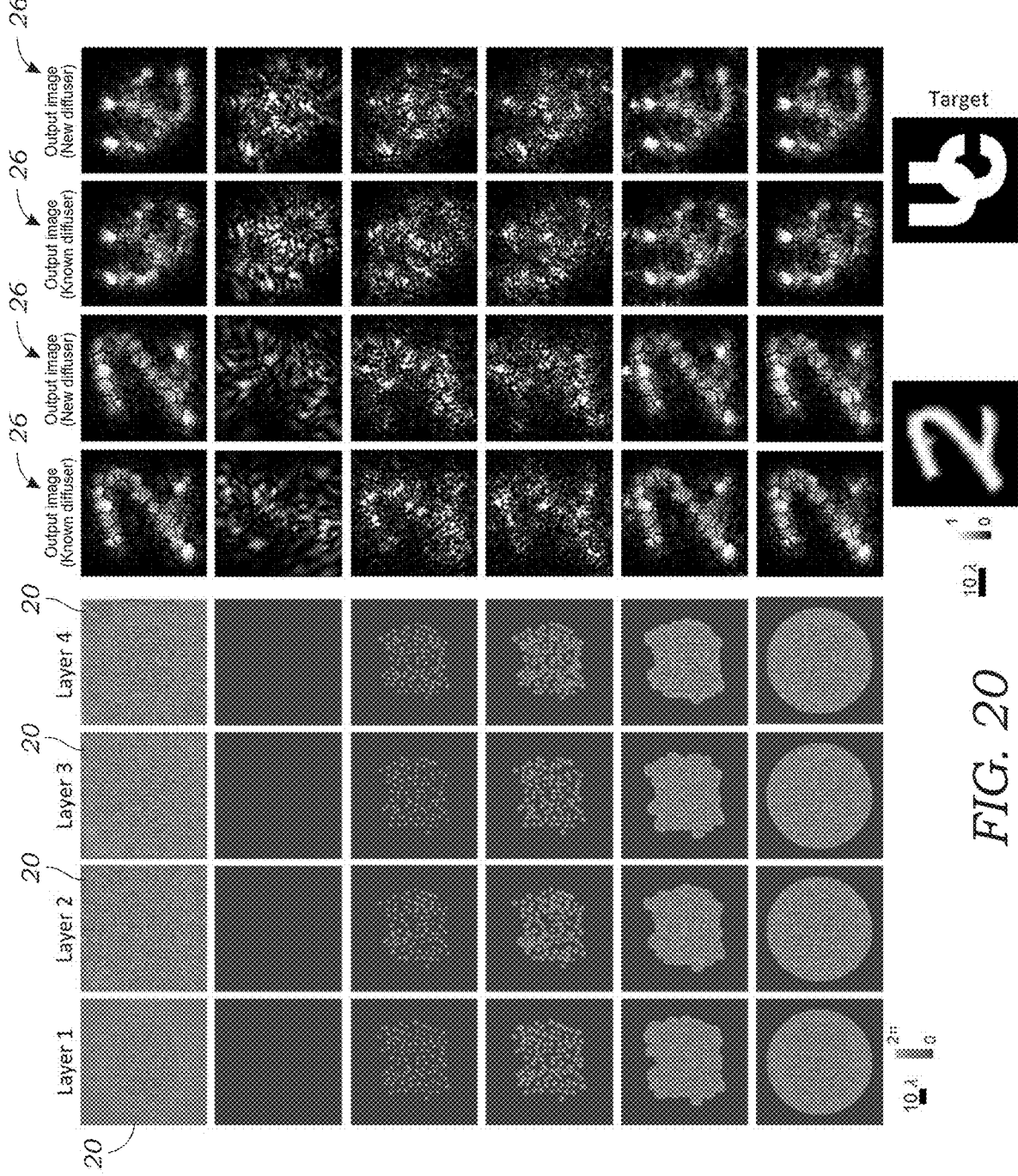
FIG. 20 illustrates a comparison of diffractive network output images under different levels of pruning. Pruning of neurons outside the phase islands of each diffractive layer was conducted and the resulting diffractive layers were used to image through unknown random diffusers. The output images of the diffractive network that was trained using n=20 diffusers at each epoch are shown in the first row as a baseline. The PCC values of the output images of handwritten digit '2' distorted by a known and new diffuser were calculated to be 0.7797 and 0.7932, respectively. The intensity distribution of the output field-of-view without the presence of the diffractive layers is also shown (second row) and the corresponding PCC values were calculated to be 0.5321 and 0.5350 with a known and a new diffuser, respectively. The spatial maps presented in FIG. 19 were used to prune the diffractive layers by dropping out the neurons outside the phase islands, i.e., only keeping the phase modulation provided by those phase islands and assuming that other neurons provide zero phase modulation. The pruned diffractive layers and the corresponding output images are shown in the third row, and the PCC values of the output images of handwritten digit '2' distorted by a known and new diffuser were calculated to be 0.5487 and 0.5452 with a known and a new diffuser, respectively. Further dilation of the binary spatial maps to include neurons right adjacent to the phase islands failed to significantly improve the reconstruction fidelity (fourth row), yielding PCC values of 0.5627/0.5344. Using all the neurons/pixels within the contour defined by the phase islands, the reconstructed images still contained some artifacts as shown in the fifth row, providing PCC values of 0.7543/0.7340. Finally, using all the pixels on each layer within a circular aperture of 80λ diameter further improved the output images, yielding PCC values of 0.7797/0.7934. A more complicated input object and its reconstruction results are also presented in the right two columns. This type of object was not included in the training phase, which only involved handwritten digits (MNIST).

As demonstrated in the numerical and experimental results, a diffractive optical network model trained with MNIST dataset can all-optically reconstruct unknown resolution test targets through new random diffusers, both of which were not included in the training dataset; these results confirm that the trained diffractive networks do not perform dataset-specific reconstruction, but serve as a general-purpose imager that can reconstruct objects through unknown diffusers. The same conclusion is further supported by the fact that once the diffuser is eliminated from the same set-up, the trained diffractive networks still provide a correct image of the sample at their output, in fact with improved reconstruction fidelity (see FIGS. 16A, 16B). Further investigation of the phase patterns of the designed diffractive layers 20 sheds additional information on the imaging capability of the diffractive optical network 10: the combination of an array of small phase islands and the rapidly changing phase variations surrounding these islands work together in order to collectively image the input objects 14 through unknown, random phase diffusers (see FIGS. 19 and 20). Moreover, the generalization of the diffractive network's imaging capability to different types of objects that were not included in the training phase is also emphasized in FIG. 20.

Figure 18:
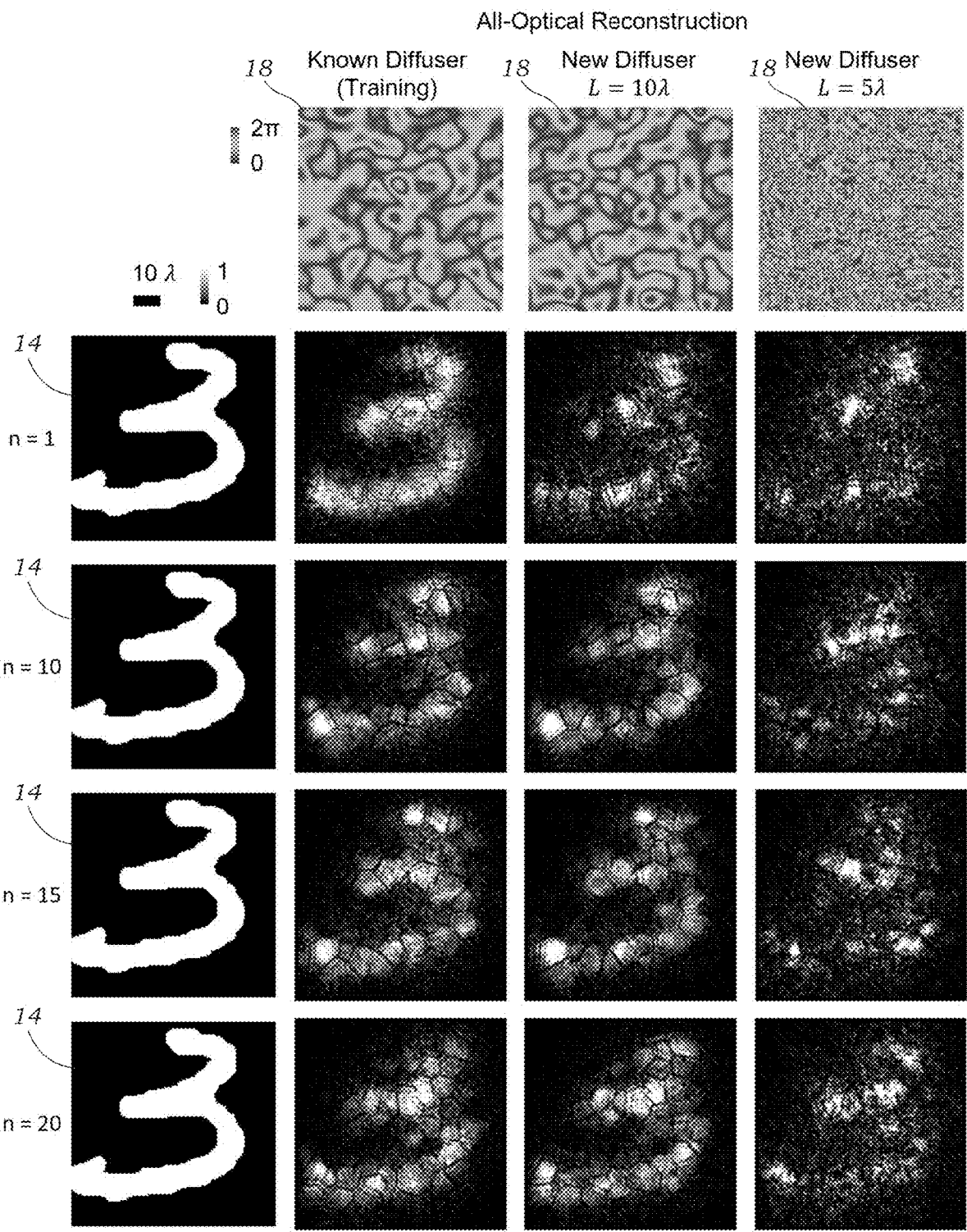
FIG. 18 illustrates the results of imaging through random diffusers with different correlation lengths (L). Diffractive networks designed/trained with a larger correlation length (L=10λ) were used to blindly reconstruct images distorted by an unknown, new diffuser with a smaller correlation length (L=5λ). Although these diffractive networks were solely trained using random phase diffusers with L=10λ, they were still successful in all-optical imaging through a random diffuser with L=5λ; see e.g., the network that used n=20, the bottom row. For better visualization, the contrast of the diffractive images is enhanced using the default MATLAB function (imadjust).

To further demonstrate the generalization of the all-optical image reconstructions achieved by trained diffractive optical networks 10, FIG. 18 reports the reconstruction of unknown test objects that were seen through a new diffuser, which had a smaller correlation length (~5λ) compared to the training diffusers (~10λ); stated differently, not only the randomly generated test diffuser was not used as part of the training, but also it included much finer phase distortions compared to the diffusers used in the training. The results presented in FIG. 18 reveal that, despite a reduction in image contrast, the test objects 14 can still be faithfully reconstructed at the output of the same diffractive network designs using a new diffuser with a smaller correlation length, further deviating from the training phase.

All the results presented herein are based on optically thin phase diffusers, which is a standard assumption commonly used in various related studies. As a result of this assumption, the results ignore multiple scattering within a volumetric diffuser. It should be appreciated that diffractive optical network models can be trained that can generalize over volumetric diffusers that distort both the phase and amplitude profiles of the scattered fields at the input plane 21 of a diffractive optical network 10. In reality, the experiments already include 3D-printed diffusers that present both phase and amplitude distortions due to the absorption of the THz beam as it passes through different thicknesses of individual features 22 of a fabricated diffuser. Considering the fact that the training of the diffractive optical network models only included random phase diffusers, the success of the experimental results with 3D-printed diffusers indicates the robustness of this framework to more complex diffuser structures not included in the training. For example, the diffractive optical networks 10 may be used to all-optically reconstruct object information passing through volumetric diffusive and/or scattering media 18 and can form the basis of a new generation of imaging systems that can see through e.g., tissue scattering, clouds, fog, etc. at the speed of light, without the need for any digital computation. Hybrid systems that utilize diffractive networks as a front-end of a jointly-trained electronic neural network (back-end) is another exciting future research direction that will make use of the presented framework to see through more complicated, dynamic scatters. Another application is the reconstruction of multi-color images distorted by unknown, random diffusers or other aberration sources. Finally, the results and presented method can be extended to other parts/spectral bands of the electromagnetic spectrum including e.g., ultraviolet wavelengths, visible wavelengths, infrared wavelengths, THz wavelengths, millimeter waves, radio waves, and will open up various new applications in biomedical imaging, astronomy, astrophysics, atmospheric sciences, security, robotics, autonomous vehicles, and many others.

Methods

Terahertz Continuous Wave Scanning System

Figure 9E:
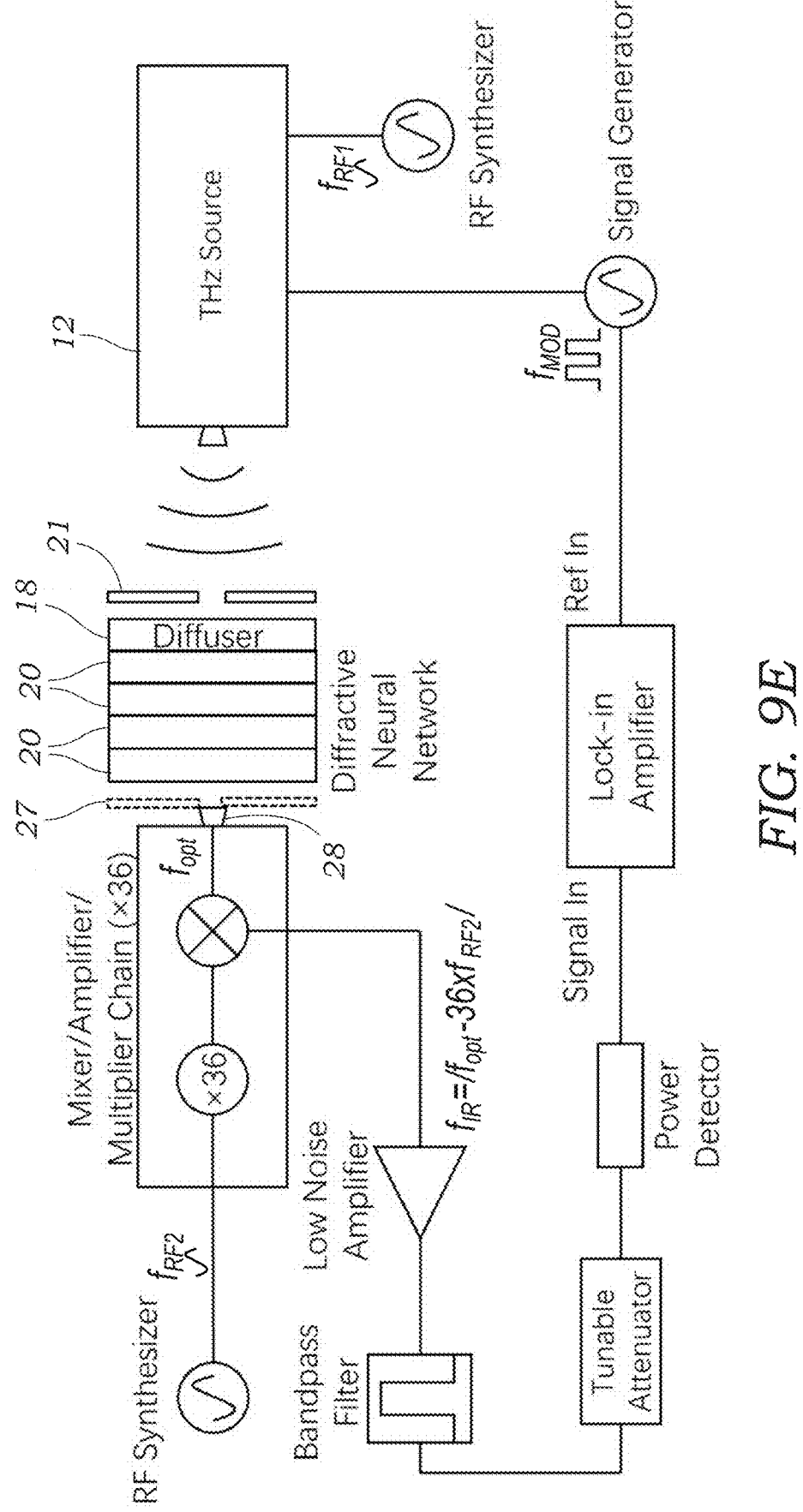
FIG. 9E schematically illustrates the experimental apparatus used for testing the design shown in FIG. 9C using continuous wave coherent THz illumination.

The schematic diagram of the experimental setup used is illustrated in FIG. 9E. Incident wave was generated through a WR2.2 modular amplifier/multiplier chain (AMC), and output pattern was detected with a Mixer/AMC, both from Virginia Diode Inc. (VDI). A 10 dBm sinusoidal signal at 11.111 GHz (fRF1) was sent to the source as RF input signal and multiplied 36 times to generate continuous-wave (CW) radiation at 0.4 THz, and another 10 dBm sinusoidal signal at 11.083 GHz (fRF2) was sent to the detector as a local oscillator for mixing, so that the down-converted signal was at 1 GHz. A home antenna compatible with WR 2.2 modular AMC was used. The source was electrically modulated with a 1 kHz square wave. The source was put far enough from the input object 14 so that the incident beam can be approximated as a plane wave. A customized reflector is added to the horn antenna to further suppress the reflection noise. The resulting diffraction pattern 26 at the output plane 27 of the diffractive optical network 10 was scanned by a single-pixel detector 28 placed on an XY positioning stage. This stage was built by placing two linear motorized stages (Thorlabs NRT100) vertically to allow precise control of the position of the detector 28. The output IF signal of the detector 28 was sent to two low-noise amplifiers (Mini-Circuits ZRL-1150-LN+) to amplify the signal by 80 dBm and a 1 GHz (+/−10 MHz) bandpass filter (KL Electronics 3C40-1000/T10-O/O) to get rid of the noise coming from unwanted frequency bands. The amplified signal passed through a tunable attenuator (HP 8495B) and a low-noise power detector (Mini-Circuits ZX47-60), then the output voltage was read by a lock-in amplifier (Stanford Research SR830). The modulation signal was used as the reference signal for the lock-in amplifier. Calibration was performed for each measurement by tuning the attenuation and recorded the lock-in amplifier readings. The raw data were converted to linear scale according to the calibration.

Random Diffuser Design

A random diffuser is modeled as a pure phase mask, whose transmittance $t_D(x, y)$ is defined using the refractive index difference between air and diffuser material ($\Delta n \approx 0.74$) and a random height map $D(x, y)$ at the diffuser plane, i.e., $$t_D(x, y) = \exp\left(j\frac{2\pi\Delta n}{\lambda}D(x, y)\right) \qquad (2)$$

where $j=\sqrt{-1}$ and $\lambda=0.75$ mm. The random height map $D(x,y)$ is further defined as $$D(x, y) = W(x, y) * K(\sigma). \qquad (3)$$

where $W(x, y)$ follows normal distribution with a mean $\mu$ and a standard deviation $\sigma_0$, i.e.

$$W(x,y) \sim \mathcal{N}(\mu, \sigma_0). \qquad (4)$$

$K(\sigma)$ is the zero mean Gaussian smoothing kernel with standard deviation of $\sigma$. '*' denotes the 2D convolution operation. In this work, $\mu=25\lambda$, $\sigma_0=8\lambda$ and $\sigma=4\lambda$ were chosen to randomly generate the training and testing diffusers, mimicking glass-based diffusers used in the visible part of the spectrum. For this choice of diffuser parameters, the mean correlation length (L) was calculated using a phase-autocorrelation function $R_d(x, y)$ that is defined as $$R_d(x, y) = \exp\left(-\pi(x^2 + y^2)/L^2\right). \qquad (5)$$

Based on 2000 randomly generated diffusers with the above-described parameters and their corresponding phase-autocorrelation functions, the average correlation length was determined as $\sim 10\lambda$. Different from these diffusers, for FIG. 18, $\sigma=2\lambda$ was used to randomly generate phase diffusers with an average correlation length of $L=\sim 5\lambda$.

The difference between two randomly-generated diffusers are quantified by the average pixel-wise absolute phase difference, i.e., $\Delta\phi=|\overline{(\phi_1-\overline{\phi_1})-(\phi_2-\overline{\phi_2})}|$, where $\phi_1$ and $\#_2$ represent the 2D phase distributions of two diffusers, and $\overline{\phi_1}$ and $\overline{\phi_2}$ are the mean phase values of each. When one randomly generates new phase diffusers, it can be regarded as a novel/unique diffuser when $\Delta\phi>\pi/2$ compared to all the existing diffusers randomly created before that point.

Forward Propagation Model

A random phase diffuser defined in Eq. (2) positioned at $z_0$ provides a phase distortion: $t_D(x, y)$. Assuming that a plane wave is incident at an amplitude-encoded image $h(x, y, z=0)$ positioned at $z=0$, the disturbed image was modeled as:

$$u_0(x, y, z_0) = t_D(x, y) \cdot [h(x, y, 0) * w(x, y, z_0)] \qquad (6)$$

where, $$w(x, y, z) = \frac{z}{r^2}\left(\frac{1}{2\pi r} + \frac{1}{j\lambda}\right)\exp\left(\frac{j2\pi r}{\lambda}\right) \qquad (7)$$

is the propagation kernel following the Rayleigh-Sommerfeld equation with $r=\sqrt{x^2+y^2+z^2}$. The distorted image is further used as the input field to the subsequent diffractive system. The transmission of layer m (located at $z=z_m$) of a diffractive system provides a field transmittance:

$$t_m = \exp(j\phi(x,y,z_m)). \qquad (8)$$

Being modulated by each layer, the optical field $u_m(x, y, z_m)$ right after the $m^{th}$ diffractive layer positioned at $z=z_m$ can be formulated as $$u_m(x, y, z_m) = t_m(x, y, z_m) \cdot [u_{m-1}(x, y, z_{m-1}) * w(x, y, \Delta z_m)] \qquad (9)$$

where $\Delta z_m$ is the axial distance between two successive diffractive layers, which was selected as $2.7\lambda$. After being modulated by all the M diffractive layers, the light field is further propagated by an axial distance of $\Delta z_d=9.3\lambda$ onto the output plane, and its intensity is calculated as the output of the network, i.e., $$o(x, y) = |u_M * w(x, y, \Delta z_d)|^2. \qquad (10)$$

Network Training

The diffractive optical networks 10 used in this work were designed for $\lambda \approx 0.75$ mm coherent illumination and contain $240 \times 240$ pixels on each layer providing phase-only modulation on the incident light field, with a pixel size (pitch) of 0.6 mm. During the training, each hand-written digit of the MNIST training dataset is first upscaled from $28 \times 28$ pixels to $160 \times 160$ pixels using bilinear interpolation, then padded with zeros to cover $240 \times 240$ pixels. B=4 different randomly selected MNIST images form a training batch. Each input object $h_b(x, y)$ in a batch is numerically duplicated n times and individually disturbed by a set of n randomly selected diffusers. These distorted fields are separately forward propagated through the diffractive network. At the output plane, there are n different intensity patterns: $o_{b1}, o_{b2} \ldots o_{bn}$. All B×n output patterns are collected to calculate the loss function:

$$\text{Loss} = \frac{\sum_{b,i=1}^{b=4,i=n} \{-P(o_{bi}, h_b) + E(o_{bi}, h_b)\}}{B \times n} \qquad (11)$$

In Eq. (10) $P(o_{bi}, h_b)$ denotes the PCC between the output and its ground truth image $h_b$, calculated based on Eq. (1). Furthermore, $E(o_{bi}, h_b)$ denotes an object-specific energy efficiency-related penalty term, defined as:

$$E(o_{bi}, h_b) = \frac{\sum_{x,y}(\alpha(1 - \tilde{h}_{b_i}) \cdot o_{bi} - \beta \tilde{h}_{b_i} \cdot o_{bi})}{\sum_{x,y} \tilde{h}_{b_i}}. \qquad (12)$$

In Eq. (11) $\tilde{h}_{b_i}$ is a binary mask indicating the transmittance area on the input object, defined as:

$$\tilde{h}_{b_i}(x, y) = \begin{cases} 1, & h_b(x, y) > 0 \\ 0, & \text{otherwise} \end{cases}, \qquad (13)$$

where $\alpha$ and $\beta$ are hyper-parameters that are optimized to be 1 and 0.5 respectively.

The resulting loss value (error) is then back-propagated and the pixel phase modulation values are updated using the Adam optimizer with a decaying learning rate of $Lr=0.99^{Ite} \times 10^{-3}$, where Ite denotes the current iteration number. The models were trained using Python (v3.7.3) and TensorFlow (v1.13.0, Google Inc.) for 100 epochs with a GeForce GTX 1080 Ti graphical processing unit (GPU, Nvidia Inc.), an Intel® Core™ i9-7900X central processing unit (CPU, Intel Inc.) and 64 GB of RAM. Training of a typical diffractive network model takes ~24 hours to complete with 100 epochs and n=20 diffusers per epoch. The phase profile of each diffractive layer 20 was then converted into the height map and corresponding .stl file was generated using MATLAB, and subsequently 3D printed using Form 3 3D printer (Formlabs Inc., MA, USA).

Quantification of the Reconstructed Resolution Test Target Period

For an amplitude-encoded, binary resolution test target (with a period of p) the transmission function can be written as:

$$h_t(x, y) = \begin{cases} 1, & x \in \left(-\frac{5}{2}p, -\frac{3}{2}p\right) \cup \left(-\frac{p}{2}, \frac{p}{2}\right) \cup \left(\frac{3}{2}p, \frac{5}{2}p\right). \\ 0, & \text{otherwise} \end{cases} \qquad (14)$$

The diffractive network forms the reconstructed image $o(x, y)$ of the resolution test target at the output field-of-view, over an area of $X{\times}Y$ mm². To quantify/measure the period of the reconstructed test targets, the intensity was first averaged along the y axis, yielding a 1D intensity profile:

$$l(x) = \frac{\int_{y=0}^{Y} o(x, y) \cdot dy}{Y}. \qquad (15)$$

Subsequently a curve $F(x)$ was fit to $l(x)$ by solving:

$$\underset{a_1, a_2, a_3, b_1, b_2, b_3, c_1, c_2, c_3}{\arg\min} \left(\sum \|F(x) - l(x)\|^2\right), \qquad (16)$$

where $$F(x) = a_1 \exp\left(-\left(\frac{x - b_1}{c_1}\right)^2\right) + a_2 \exp\left(-\left(\frac{x - b_2}{c_2}\right)^2\right) + a_3 \exp\left(-\left(\frac{x - b_3}{c_3}\right)^2\right). \qquad (17)$$

The measured/resolved period ($\hat{p}$) at the output image lane is then calculated as:

$$\hat{p} = \frac{\max(b_1, b_2, b_3) - \min(b_1, b_2, b_3)}{2}. \qquad (18)$$

Image Contrast Enhancement

For the purpose of better image visualization, the contrast of each experimental measurement was digitally enhanced using a built-in MATLAB function (imadjust), which by-default saturates the top 1% and the bottom 1% of the pixel values and maps the resulting image to a dynamic range between 0 and 1. The same default image enhancement is also applied to the results shown in FIGS. 9B, 9C, 13, 14, and 18. All quantitative data analyses, including PCC calculations and resolution test target period quantification results, are based on raw data, i.e., did not utilize image contrast enhancement.

Lens-Based Imaging System Simulation

A lens-based imaging system was numerically implemented to evaluate the impact of a given random diffuser on the output image: see e.g., FIG. 9B. A Fresnel lens was designed to have a focal length (f) of 145.6λ and a pupil diameter of 104λ. The transmission profile of the lens $t_L$ was formulated as:

$$t_L(\Delta x, \Delta y) = A(\Delta x, \Delta y)\exp\left(-j\frac{\pi}{\lambda f}(\Delta x^2 + \Delta y^2)\right), \qquad (19)$$

where $\Delta x$ and $\Delta y$ denote the distance from the center of the lens in lateral coordinates. $A(\Delta x, \Delta y)$ is the pupil function. i.e., $$A(\Delta x, \Delta y) = \begin{cases} 1, & \sqrt{\Delta x^2 + \Delta y^2} < 52\lambda \\ 0, & \text{otherwise} \end{cases}, \qquad (20)$$

The lens was placed 2f (291.2λ) away from the input object. The input object light was first propagated axially for $z_0=53\lambda$ to the random diffuser plane using the angular spectrum method. The distorted field through the diffuser was then propagated to the lens plane, and after passing through the lens the resulting complex field was propagated to the image plane (2f behind the lens), also using the angular spectrum method. The intensity profile at the image plane was calculated as the resulting image, seen through an aberration-free lens, distorted by a random phase diffuser.

While embodiments of the present invention have been shown and described, various modifications may be made without departing from the scope of the present invention. The invention, therefore, should not be limited, except to the following claims, and their equivalents.

What is claimed is:

1. A diffractive optical network that sees through diffusive and/or scattering media to capture accurate optical images, optical signals, or optical data comprising:

one or more optically transmissive and/or reflective substrate layers arranged in an optical path, each of the optically transmissive and/or reflective substrate layer(s) comprising a plurality of physical features formed on or within the one or more optically transmissive and/or reflective substrate layers and having different transmission and/or reflection properties as a function of local coordinates across each substrate layer, wherein the one or more optically transmissive and/or reflective substrate layers and the plurality of physical features thereon collectively define a trained mapping function between (1) an input optical image, input optical signal, or input optical data to the diffractive optical network and (2) an output optical image, output optical signal, or output optical data created by optical diffraction and/or reflection through/off the one or more optically transmissive and/or reflective substrate layers, the trained mapping function reconstructing the optical image, optical signal, or optical data that passes through unknown diffusive and/or scattering media and is projected onto an observation plane and/or one or more optical detectors configured to see or capture the output optical image, output optical signal, or output optical data resulting from the diffractive optical network.

2. The diffractive optical network of claim 1, wherein a property of the diffusive and/or scattering media changes as a function of time.

3. The diffractive optical network of claim 1, wherein one or more layers of the diffractive optical network comprise reconfigurable spatial light modulators.

4. The diffractive optical network of claim 1, wherein the one or more optical detectors comprises a detector array.

5. The diffractive optical network of claim 1, wherein the diffractive optical network outputs an image and/or optical signal and/or optical data onto one or more optical detectors or onto an output observation plane.

6. The diffractive optical network of claim 5, wherein the one or more optical detectors and/or the output observation plane are used to perform an object classification decision.

7. The diffractive optical network of claim 1, wherein the one or more optical detectors comprises one or more detectors that is/are scanned in the x and y directions.

8. The diffractive optical network of claim 1, wherein the input optical image is illuminated with a natural or artificial light source or sources.

9. The diffractive optical network of claim 1, wherein the one or more optical detectors detects an optical image, optical signal, or optical data in one of the following spectral bands or wavelengths: ultra-violet wavelengths, visible wavelengths, infrared wavelengths, THz wavelengths, millimeter waves, and radio waves.

10. The diffractive optical network of claim 1, wherein the unknown diffusive and/or scattering media comprises one or more of a solid, liquid, gas, or combinations thereof.

11. The diffractive optical network of claim 10, wherein a property of the unknown diffusive and/or scattering media changes as a function of time.

12. A method of seeing through diffusive and/or scattering media to capture an accurate optical image, optical signal, or optical data comprising:

passing an input optical images, optical signals, or optical data through an unknown diffusive and/or scattering media and into a diffractive optical network comprising one or more optically transmissive or reflective substrate layers arranged along an optical path, each of the optically transmissive or reflective substrate layer(s) comprising a plurality of physical features formed on or within the one or more optically transmissive or reflective substrate layers, and having different transmissive or reflection properties as a function of local coordinates across each substrate layer, wherein the one or more optically transmissive or reflective substrate layers and the plurality of physical features collectively define a trained mapping function between (1) an input optical image, input optical signal, or input data to the diffractive optical network and (2) an output optical image, output optical signal, or output optical data from the one or more optically transmissive or reflective substrate layers, the trained mapping function reconstructing the optical image, optical signal, or optical data that passes through the unknown diffusive and/or scattering media; and projecting the output optical image, output optical signal, or output optical data onto an observation plane and/or one or more optical detectors configured to see or capture the output optical image, output optical signal, or output optical data resulting from the diffractive optical network.

13. The method of claim 12, wherein a property of the unknown diffusive and/or scattering media changes as a function of time.

14. The method of claim 12, wherein one or more layers of the diffractive optical network comprise reconfigurable spatial light modulators.

15. The method of claim 12, wherein the one or more optical detectors comprises a detector array.

16. The method of claim 12, wherein the one or more optical detectors and/or the output observation plane are used to perform an object classification decision.

17. The method of claim 12, wherein the one or more optical detectors comprises one or more detectors that is/are scanned in the x and y directions.

18. The method of claim 12, wherein the input optical image is illuminated with a natural or artificial light source or sources.

19. The method of claim 12, wherein the one or more optical detectors detects an optical image, optical signal, or optical data in one of the following spectral bands or wavelengths: ultra-violet wavelengths, visible wavelengths, infrared wavelengths, THz wavelengths, millimeter waves, and radio waves.

20. The method of claim 12, wherein the unknown diffusive and/or scattering media comprises one or more of a solid, liquid, er gas, or combinations thereof.

21. The method of claim 20, wherein a property of the unknown diffusive and/or scattering media changes as a function of time.

22. A method of forming a diffractive optical network that sees through diffusive and/or scattering media to capture accurate optical images, optical signals, or optical data comprising:

training with at least one computing device a diffractive optical network model formed by one or more substrate layers to reconstruct an optical image, optical signal, or optical data that passes through the diffusive and/or scattering media that would otherwise degrade the optical image, optical signal, or optical data, the diffractive optical network model having a plurality of optically transmissive and/or optically reflective physical features located in different locations in each of the one or more substrate layers of the network, wherein the training comprises feeding an input plane of the diffractive optical network model with training images, training optical signals, or training optical data along with a plurality of different diffusive and/or scattering media, followed by computing an optical output of the diffractive optical network model through optical transmission and/or reflection resulting from the diffractive optical network and iteratively adjusting transmission and/or reflection coefficients for each substrate layer of the diffractive optical network until optimized transmission/reflection coefficients are obtained to reconstruct the optical image, optical signal, or optical data
that passes through a new diffusive and/or scattering
media; and manufacturing or having manufactured or otherwise fab-
ricated a physical embodiment of the diffractive optical
network comprising one or more transmissive and/or
reflective substrate layers having physical features that
match the optimized transmission/reflection coeffi-
cients obtained by the training.

23. The method of claim 22, wherein the diffusive and/or
scattering media used for training of the diffractive optical
network model or with the physical embodiment of the
diffractive optical network comprises one or more of a solid,
liquid, gas, or combinations thereof.

24. The method of claim 23 wherein a property of the
diffusive and/or scattering media changes as a function of
time.

25. The method of claim 22, wherein the diffractive
optical network model is trained with between 2 and 1,000
different diffusive and/or scattering media.

26. The method of claim 22, wherein one or more layers
of the physical embodiment of the diffractive optical net-
work comprise reconfigurable spatial light modulators.

27. The method of claim 22, wherein the physical embodi-
ment of the diffractive optical network outputs an optical
image and/or optical signal and/or optical data onto one or
more optical detectors or onto an output observation plane.

28. The method of claim 27, wherein the one or more
optical detectors and/or the output observation plane are
used to perform an object classification decision.

29. The method of claim 27, wherein the one or more
optical detectors comprise one or more detectors that is/are
scanned in the x and y directions.

30. The method of claim 22, wherein the plurality of
different diffusive and/or scattering media used to train the
diffractive optical network model have the same statistical
correlation length.

* * * * *